United States Patent
Dague et al.

[11] Patent Number: 5,885,460
[45] Date of Patent: Mar. 23, 1999

[54] ANAEROBIC MIGRATING BLANKET REACTOR

[75] Inventors: Richard R. Dague, deceased, late of Ames, Iowa, by Alice J. Dague, executrix; Largus T. Angenent, Ames, Iowa

[73] Assignee: Iowa State University Research Foundation, Inc., Ames, Iowa

[21] Appl. No.: 850,728

[22] Filed: May 2, 1997

Related U.S. Application Data

[60] Provisional application No. 60/017,063 May 3, 1996.

[51] Int. Cl.$^6$ .................................................. C02F 3/28
[52] U.S. Cl. .......................... 210/605; 210/614; 210/630; 210/921
[58] Field of Search .................................. 210/603, 605, 210/614, 630, 921, 201, 255, 743

[56] References Cited

U.S. PATENT DOCUMENTS

| | | | |
|---|---|---|---|
| 3,926,795 | 12/1975 | Saldick | 210/605 |
| 4,154,685 | 5/1979 | Marcotte | 210/255 |
| 4,503,154 | 3/1985 | Paton | 210/603 |
| 5,110,459 | 5/1992 | Baxter | 210/605 |
| 5,185,079 | 2/1993 | Dague | 210/603 |
| 5,192,442 | 3/1993 | Piccirillo et al. | 210/605 |
| 5,228,996 | 7/1993 | Lansdell | 210/605 |
| 5,525,228 | 6/1996 | Dague et al. | 210/603 |
| 5,605,629 | 2/1997 | Rogalla | 210/605 |
| 5,725,770 | 3/1998 | Henry | 210/603 |

*Primary Examiner*—Thomas G. Wyse
*Attorney, Agent, or Firm*—Henderson & Sturm

[57] ABSTRACT

A continuously fed, compartmentalized reactor that reverses its flow in a horizontal manner. This system is developed without the requirement of elaborate gas-solids-separator and feed-distribution systems. Effluent recycling is not required, but mixing is necessary to obtain a sufficient biomass/substrate contact. This process is known as the anaerobic migrating blanket reactor (AMBR). A key to the selection of a granular biomass in the AMBR process, and thus to the reactor performance, is the migration of the blanket through the reactor. A higher rate of migration of flocculent biomass, compared with granular biomass, is responsible for the wash out of less settleable, flocculent biomass. In this way, the formed aggregates are retained in the reactor and grow in size.

10 Claims, 15 Drawing Sheets

5,885,460

ANAEROBIC MIGRATING BLANKET REACTOR

STATEMENT REGARDING FEDERALLY SPONSORED RESEARCH OR DEVELOPMENT

Research related to this invention was supported by grants from the U.S. Department of Agriculture, Contract Number 91-34188-5943, through the Iowa Biotechnology Products Consortium and from the Center of Advanced Technology Development, Iowa State University, Ames, Iowa U.S.A.

CROSS-REFERENCE TO RELATED APPLICATIONS

This application contains disclosure from and claims the benefit under 35 U.S.C. § 119(e) of United States Provisional Application, Ser. No. 60/017,063, filed May 3, 1996, and entitled "Anaerobic Migrating Blanket Reactor," which application is incorporated herein by reference.

AUTHORIZATION PURSUANT TO 37 C.F.R. §1.71 (d) (e)

A portion of the disclosure of this patent document, including appendices, may contain material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to anaerobic treatment of wastes, and more particularly to an anaerobic migrating blanket reactor utilizing multiple compartments.

2. Description of the Related Art

The numbers in brackets refer to publications listed in the Appendix, the teachings of which are incorporated herein by reference.

Anaerobic treatment of industrial and domestic wastewater has proven to be sustainable over the last 20 years. Especially, the upflow anaerobic sludge blanket (ASB) process and its derivatives have shown good performances and stability in numerous full-scale operations world-wide [19, 20]. However, other immobilized biomass processes have been developed for several reasons. The loss of biomass with the effluent due to excessive bed expansion or poor granulation, for example, can pose problems to non-compartmentalized reactors like the UASB process [16].

Compartmentalization in anaerobic reactors was first described by Bachman et al. [6] who developed the anaerobic baffled reactor (ABR). In this reactor, the wastewater flows under and over vertical baffles. Other compartmentalized reactor types have been developed like the horizontal-baffled anaerobic reactor [36], the internal circulation (IC) reactor [17], the multiplate anaerobic reactor (MPAR) [11], the "biogas turmreaktor" [22], and the upflow staged sludge bed (US SB) reactor [31]. An upwards feeding and reversing flow pattern has shown improved settling characteristics and granulation in the reversing anaerobic upflow system (RAUS). This system combines compartmentalization with a reversing flow pattern [8]. The two-stage anaerobic unitank system (TSU-AN-system), a modification of the UASB process, combines the same characteristics [9, 34]. In the above mentioned processes, an hydraulic upflow pattern is responsible for the contact between substrate and biomass. In addition to the compartmentalization, a difference between the ABR and the UASB process is the absence of a special gas-solids-separator system, which simplifies the design [7]. Moreover, the anaerobic sequencing batch reactor (ASBR) is a batch-fed process which does not have an hydraulic upflow pattern. This results in the absence of gas-solids-separator and feed-distribution systems [27, 2]. However, Wirtz and Dague [35] developed a granular blanket with an ASBR in five months after seeding the reactor with non-granular primary digester sludge. This result indicates that granulation does not solely depend on an hydraulic upflow pattern, which was also found by Vanderhaegen et al. [30].

Those concerned with these and other problems recognize the need for an improved anaerobic migrating blanket reactor.

BREIEF SUMMARY OF THE INVENTION

The present invention discloses a continuously fed, compartmentalized reactor that reverses its flow in a horizontal manner. This system is developed without the requirement of elaborate gas-solids-separator and feed-distribution systems. Effluent recycling is not required, but mixing is necessary to obtain a sufficient biomass/substrate contact [3]. This process is known as the anaerobic migrating blanket reactor (AMBR). A key to the selection of a granular biomass in the AMBR process, and thus to the reactor performance, is the migration of the blanket through the reactor. A higher rate of migration of flocculent biomass, compared with granular biomass, is responsible for the wash out of less settleable, flocculent biomass. In this way, the formed aggregates are retained in the reactor and grow in size [3].

Research has shown that acidogenic conditions in a two-phase treatment concept show negative effects on in-reactor granular growth [30]. Hence, the emphasis of this invention is on staging, rather than on phasing of the acidogenesis and methanogenesis. In a staged process all phases of anaerobic digestion are present, but acidogenic activities will be higher in the initial compartments. The advantage of a slight pre-acidification in a staged process has been postulated by Fox and Pohland [13] and Lettinga [20]. Plugflow conditions, which promote partial phase separation, will be enhanced by the absence of recycling and by offsetting mixing effects of gas production [13]. However, total phase separation in the AMBR process will be prevented by reversing the flow over the horizontal plain of the reactor [3].

Therefore, an object of the present invention is the provision of a compartmentalized anaerobic migrating blanket reactor.

BRIEF DESCRIPTION OF THE SEVERAL VIEWS OF THE DRAWINGS

Other objects, advantages, and novel features of the present invention will become apparent from the following detailed description of the invention when considered in conjunction with the accompanying drawings, wherein.

DETAILED DESCRIPTION OF THE INVENTION

Figure 1:
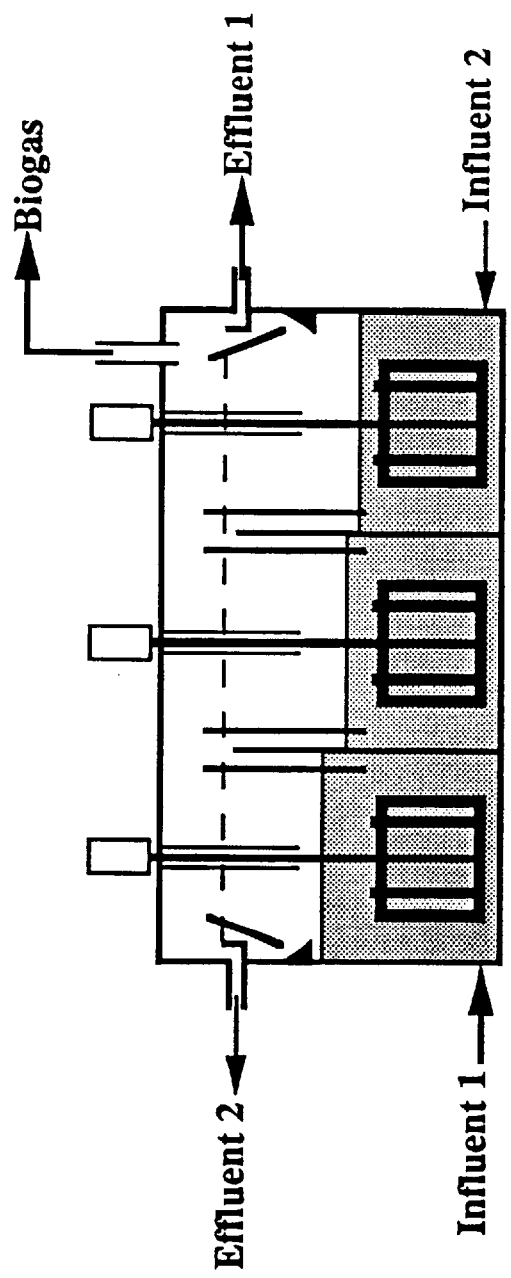
FIG. 1 is a schematic illustration of the anaerobic migrating blanket reactor (AMBR) of the present invention.

The following examples are all illustrative of the best mode of carrying out the invention. They are obviously not to be construed as limitative of the invention since various other embodiments can readily be envolved in view of the teachings provided herein.

EXAMPLE 1

In this example, the performances and principles of laboratory-scale AMBRs were investigated by feeding it sucrose as a synthetic substrate. Furthermore, the obtained results were compared with the performances of laboratory-scale UASB and ASBR systems, which have been operated under the same conditions.

ABSTRACT

A 12-liter anaerobic migrating blanket reactor (AMBR) was capable of achieving a maximum COD loading rate of 30 g/L/d at a 12 hour HRT, which resulted in a SMPR of 7 L/L/d. Although sucrose was fed as a synthetic substrate, no pre-acidification was required for the AMBR. Short circuiting could be prevented in the 54-liter AMBR by placing baffles between the compartments instead of openings in the bottom of the inside walls. This resulted in a SCOD removal of 99% up to a COD loading rate of 23 g/L/d. Next, the AMBR was able to retain high levels of biomass (40 gMLVSS/L) even at COD loading rates which exceeded 20 g/L/d. Both laboratory scale AMBRs were able to maintain and grow granular biomass, which resulted in an increase of the granule size over the operational period. A key element in the selection of granular biomass was the migration of the blanket through the reactor in wich flocculent biomass would migrate faster and would eventually wash out of the reactor. Furthermore, baffles in front of the effluent port and intermittent mixing of the final compartment have increased the selection pressure. Moreover, reversing of the flow was required to prevent phase separation and accumulation of biomass in the final compartment. Compared with a laboratory scale ASBR and UASB reactor, the performance of the AMBR was found to be superior due to approached plug-flow conditions in the compartmentalized AMBR.

MATERIALS AND METHODS

Substrate

Sucrose was used as the main carbon and energy source in these studies. As sucrose does not contain nitrogen or essential nutrients and trace elements, additives were necessary. The nutrient stock solution consisted of 290 mL/L $NH_4OH$ and 68.75 g/L $K_2HPO_4$, and was supplied by the addition of 0.886 mL/gCOD. An excess of ammonium hydroxide provided an extra alkalinity source and buffering capacity. The next elements were added to one liter of trace-elements stock solution: 50 g $FeCl_2.4H_2O$; 1.25 g $ZnCl_2$; 12.5 g $MnCl_2.4H_2O$; 1.25 g $(NH_4)_6Mo_9O_{24}.4H_2O$; 3.75 $CoCl_2.6H_2O$; 2.5 g $NiCl_2.6H_2O$; 0.75 g $CuCl_2.2H_2O$; and 1.25 g $H_3BO_3$. Trace-elements stock solution was added to the feed at a rate of 0.089 mL/gCOD. Additionally, alkalinity was added to the sucrose solution in the form of sodium bicarbonate (0.45 g/gCOD). Yeast extract was added to provide for essential growth factors (1 mg/gCOD). The make-up water (City of Ames tap-water) contained more essential nutrients, like calcium, magnesium, and sulfate. During the first two weeks of the start-up of the UASB and the ASBR processes, a solution of non fat dry milk (NFDM) was used as the feed. However, due to foam problems in the UASB reactor, the substrate was changed to sucrose.

Analysis

The composition of the biogas was measured using gas chromatography (GC) in order to calculate the amount of methane that was produced (Gow Mac Model 350 with thermal conductivity detector; Column: 6'*⅛' stainless steel Poropack Q 80/100 mesh). The individual volatile fatty acids (VFAs) were measured by GC (HP 5730A with flame ionization detector; Column: 6ft*2mm, silanized glass Carbopack C 60/80 mesh). The total alkalinity, total VFAs, total and soluble COD, sludge volume index (SVI), and total and volatile suspended solids (VSS) were performed according to procedures in Standard Methods [5]. Effluent samples of the AMBR processes were obtained at the midpoint of the time interval between two reversals of flow. At this point, the parameters were assumed to be representative of the overall performance.

Biomass characteristics

The specific methanogenic activity (SMA) was assesed with the "headspace method" according to tests described by Rinzema et al. [24]. To analyze the sizes of the granules and their change in time, the arithmetic mean diameter was calculated with automated image analysis (AIA). Samples of the overall reactor volume were mixed and diluted in order to obtain an overall distribution of clearly visible biomass particles. Next, 1.75 mL was added to a AIA-glass, which consisted of two 3 mm thick glass sheets stuck together, with a one inch circle in the top sheet. This was further covered with a thin sheet, avoiding any trapped gas. The video camera which was used: MTI series 68; Microscope: Olympus. Particles smaller than 0.1 mm were not included in the calculations of the size [14].

Assessment of the standard methane production rate and calculated TCOD removal

The biogas production was corrected to standard temperature and pressure (STP) using the ideal gas law. Next, the standard methane production rate (SMPR) can be obtained after converting the biogas production with the wet volume of the reactor and the methane percentage that is present in the biogas. Therefore, the SMPR is expressed as liters of methane per reactor volume per day (L/L/d). The SMPR is a true measure of the COD that is being removed, because methane is the final product in the stabilization of COD (0.35 L methane/gCOD). The COD loading rate is the amount of COD that is fed into the reactor per reactor volume per day (g/L/d). In order to obtain the theoretical or calculated total COD removal efficiency (calculated TCOD removal) the following formula is used:

Calculated TCOD removal, $$\% = \frac{SMPR}{COD \text{ loading rate } 0.35} \cdot 10$$

Assesment of the biomass migration rate

The biomass migration rate (BMR) is calculated by the decrease of mixed liquor volatile suspended solids (MLVSS) in the initial compartment over a time period in which the direction of flow is not reversed.

Laboratory-scale reactor studies

All systems were placed in a constant temperature room at 35° C. (+/−1° C). The concentrated substrate was stored in a refrigerator, to prevent pre-acidification, and was mixed to obtain a constant loading rate. Make-up water (35° C.) was added to the substrate just before feeding to the reactors. In order to compare the different reactor systems, operational parameters for all reactors were kept as equal as possible. The hydraulic retention time (HRT), for example, was kept constant at 12 hours throughout all studies. The COD loading rate was increased, by increasing the sucrose concentration, as soon as the VFA concentration in the effluent, pH in the reactor, and calculated TCOD removals were lower than 0.3 g/L, higher than 6.5, and around 80%, respectively, without any occuring limiting factors. Therefore, the reactors seldom operated under steady-state conditions. After an increase in the COD loading rate was implemented, the systems were given time to adjust to the new conditions. All pumps used, were Masterflex pumps of Cole Parmer Instrument Co., Chicago, Ill., USA. The gas collection systems consisted of an observation bottle, a bottle packed with steel wool to scrub hydrogen sulfide from the biogas, a gas sampling port, and a wet-test gas meter (GCA, Precision Scientific, Chicago, Ill., USA) or wet-tip gas meter (Rebel Wet-Tip Gas Meter Company, Nashville, Tenn., USA). Timers (ChronTrol Corporation, San Diego, Calif., USA) regulated the operation. Table I shows the operational parameters of the 54-liter AMBR (AMBR54), the 12-liter AMBR (AMBR12), the 12-liter UASB reactor, and the 12-liter ASBR.

TABLE I

| Operational parameters | | | | | |
|---|---|---|---|---|---|
| Operational parameters | (.) | AMBR54 | AMBR12 | UASB | ASBR |
| Temperature | (°C.) | 35 | 35 | 35 | 35 |
| pH minimum | units | 6.2 | 6.2 | 6.5 | 6.5 |
| HRT | (d) | 0.5 | 0.5 | 0.5 | 0.5 |
| Volume | (L) | 54 | 12 | 12 | 12 |
| Flow of influent | (L/d) | 108 | 24 | 24 | 24 |
| Concentrated substrate flow | (L/d) | 10.8 | 2.1 | 1.8 | 1.8 |
| Dilution (make-up water) | (—) | 10 | 11 | 13 | 13 |
| Upflow velocity | (m/h) | 0 | 0 | 0.7–1 | 0 |
| Recycle | (L/d) | 0 | 0 | 240 | 0 |
| No. of reversals in flow | (l/d) | 1–3 | 3 | 0 | 0 |
| COD loading rate at start | (g/L/d) | 10 | 8 | 6 | 6 |
| COD concentration influent* | (g/L) | 5–12.5 | 4–15.5 | 3–11.5 | 3–9.5 |

*Concentration of influent after dilution with make-up water, but without recycling.

Studies with the 54-liter AMBR

The active volume of the laboratory-scale AMBR was 54 liters and was divided into three compartments, as illustrated in FIG. 1. Wastes flowed horizontally into one end of the reactor and out the other. Since the final compartment received the lowest substrate concentration, the activity of the microbes was low in this compartment. This resulted in low biogas production, which enabled the final compartment to serve as an internal clarifier to prevent biomass loss in the effluent. The biomass, illustrated in FIG. 1 as shaded areas, tended to migrate into the final compartment. In order to prevent total phase separation and accumulation of biomass in the final compartment, the flow was reversed and the final compartment became the initial compartment and the process repeated itself. Two automatic ball valves, with an internal diameter of one inch, were used to open and close effluent ports (True Blue Electric actuator model EBV-6, Plast-o-Matic Valves Inc., Cedar Groove, N.J., USA). Three compartments were required in the AMBR in order to feed the middle compartment for a certain amount of time before the flow was reversed. In this way, a break-through of substrate could be prevented when the flow was reversed. Therefore, the middle compartment was fed for two hours between reversing the flow. Sufficient biomass/substrate contact was maintained using intermittent, gentle mixing. Research by Dague et al. [10] showed that mixing that was too intense could destroy the anaerobic bioflocs. All three compartments were mixed equally for ten seconds every seven minutes (Mixers: Model 5vb, EMI Inc., Clinton, Conn., USA). These mixers are able to start and operate at a slow speed to ensure gentle mixing. Paddle mixing further enhanced gentle mixing. The biogas was directly discharged from the reactor to the gas collection system. A water head was installed on the effluent tubes in order to prevent biogas from escaping with the effluent. Slanting baffles were placed in front of the effluent ports. The initial reactor set-up had vertical movable walls between the compartments. In this way, the size of the opening in the bottom of the inside wall was variable. But, after 76 days the openings were closed and baffles were placed between the compartments. The pH was monitored by probes in the reactor (pH-probe: Ferm-probe pH-electrode (210 mm), Phoenix Electrode Co., Houston, Tex., USA; pH-controller: Model PHCN-425, Omega Engineering Inc., Stamford, Conn., USA).

The initial seed for the reactor was collected from the effluent out of the 12-liter AMBR and consisted of flocculent and granular biomass. This had been stored in a 4° C. refrigerator for five months before it was seeded. The COD loading rate was kept constant at 10 g/L/d for the first 90 days in order to compare changes in reactor set-up. After 90 days, the COD loading rate was increased.

Studies with the 12-liter AMBR

The active volume of this laboratory-scale AMBR was 12 liters. Two openings, with a diameter of one inch, were placed on the bottom of each wall between the compartments. These openings were placed this way to create good biomass/substrate contact, to ensure migration of biomass, and to reduce short circuiting of substrate. Impeller mixers were installed in all three compartments (Mixers: model 5vb EMI, Inc., Clinton, Conn., USA; Lightning A-310 axial flow impeller). The effluent ports of the reactor were connected to a gas-liquid-separation tank. Biogas was discharged at the top of this tank to a gas collection system. The liquid would leave the separation tank through a water lock into a settling tank. Baffles before the effluent ports were glued in the reactor after 30 days of operation.

The initial seed for the 12-liter AMBR was collected from the 12-liter ASBR. The biomass had been stored in a 4° C. refrigerator for four months before it was seeded. The COD loading rate at the start-up was 8 g/L/d.

Studies with the 12-liter UASB reactor

A Plexiglas column with a height of one meter and an inside diameter of 14 cm was used to build the UASB reactor. One inlet point for the feed was located in the bottom center. Walls slanted from the bottom inlet point at an angle of approximately 45 degrees. In addition, the bottom 10 cm of the reactor was filled with marbles to achieve a good distribution of the feed and an equal upflow velocity in the reactor. Recycling was used to create a sufficient upflow velocity in the reactor. During start-up of the UASB reactor, the upflow velocity was set at 0.7 m/h. This had to be increased to one m/h to avoid trapping of biogas in the sludge blanket at the higher COD loading rates. An inverted funnel (outside diameter: 13 cm) was installed at about ¾ of the reactor height above a rim (inside diameter: 11 cm) to create the gas-solids-separator system in order to prevent the escape of gas between the reactor wall and the funnel. The funnel was connected with a foam separation and observation bottle. The pressure, and thus the height of the water surface in the funnel, could easily be manipulated by changing the water level in the observation bottle. A recycling tube was placed at about the ⅓ depth point of the settling section of the UASB reactor. Above this point, the upflow velocity in the settling section resulted only by the amount of feed pumped into the reactor, which created internal settling of biomass. Gravity was used as the force to discharge the effluent.

Seed biomass was collected from three different sources to be sure of getting a balanced microbial population. Two-thirds of the biological seed was granular sludge from a fill scale UASB reactor (G. Heileman Brewery, La Crosse, Wis., USA); one sixth were granules collected from a laboratory-scale ASBR system using NFDM as a substrate; and the rest of the biomass originated from a pilot plant ASBR (Penford; a starch producing factory, Cedar Rapids, Iowa, USA). The COD loading rate at the start-up of the UASB was 6 g/L/d.

Studies with the 12-liter ASBR

A Plexiglas column with a volume of about 13 liters and an inside diameter of 14 cm was used as the ASBR. The one liter headspace was connected to the gas collection system. Additions to the regular gas collection system were an aspirator bottle to collect and to distribute foam, and a gas bag (ball) to prevent a pressure drop in the head space during decanting of effluent. A pump was used to intermittently recirculate biogas from the aspirator bottle through the diffuser ring in the bottom of the reactor in order to provide mixing of the water contents. The ASBR was mixed for two minutes every half hour. The ASBR sequenced through four steps; feed, react, settle, and decant, as has been described by Sung and Dague [27]. The cycle time for the 12-liter ASBR was four hours, resulting in six sequences per day. Especially, the settling time before the decant step is very important. This time was chosen too long at the start-up of the 12-liter ASBR and rising of the sludge blanket due to gas production during the decant step caused a severe wash out of biomass. Next, biomass that was collected in the settling tank of the ASBR had to be reseeded after approximately one week of operation. At the same time, the length of the settling time was shortened to two minutes. This time required for settling will vary, depending on biomass concentration, settleability of the biomass, and reactor height and may range from a few minutes to an hour. Therefore, the settling time must be short to wash out the poorly settling biomass, but not so short that granular biomass is washed out of the reactor. Following these concepts, an optimal settling time can be found that will select for and enhance granulation. The biomass seed was the same as used for the start-up of the 12-liter UASB and the COD loading rate at the start of the operational time was 6 g/L/d.

RESULTS

Studies with the AMBR

Figure 2:
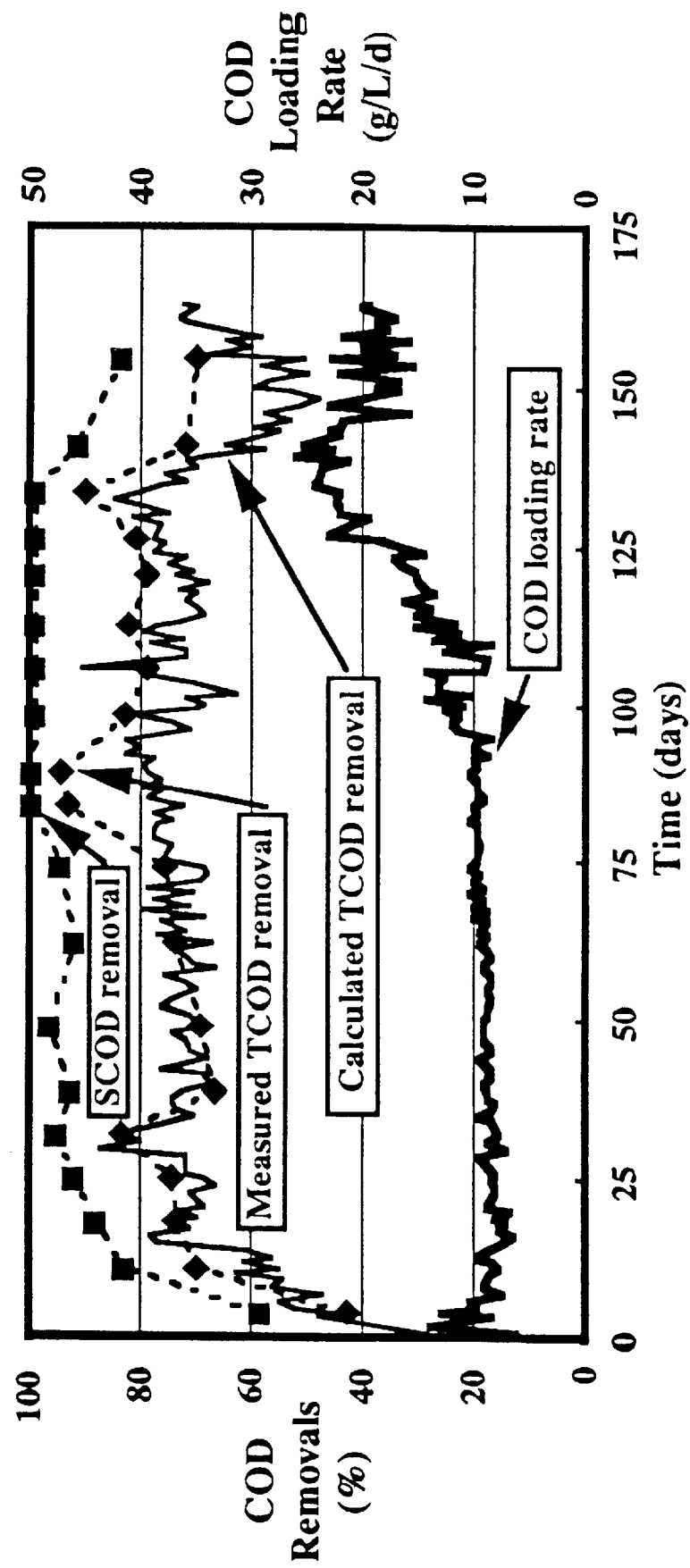
FIG. 2 is a graphical representation showing COD removal efficiencies and loading rates for the 54-liter AMBR.
Figure 3:
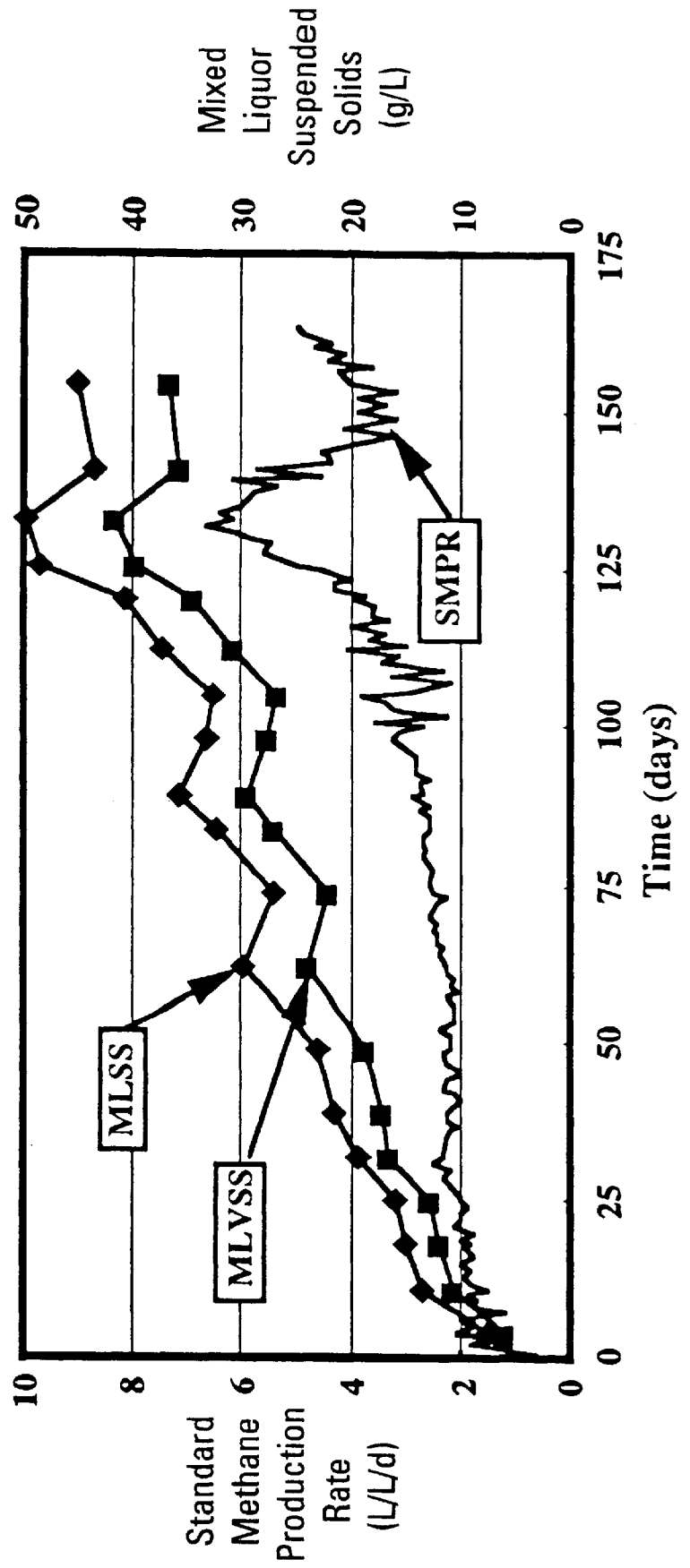
FIG. 3 is a graphical representation showing the standard methane production rate and mixed liquor suspended solids for the 54-liter AMBR.
Figure 4:
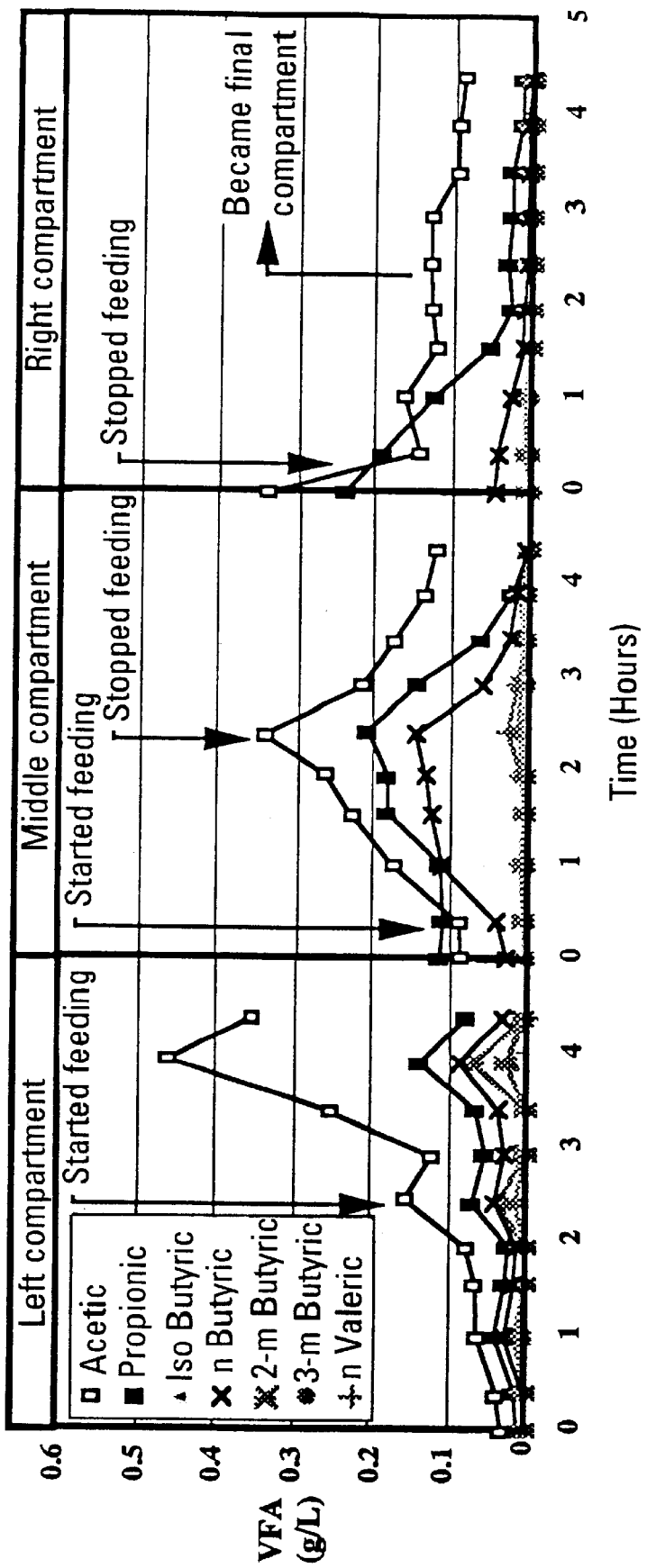
FIG. 4 is a graphical representation showing the change of VFAs in the compartments of the 54-liter AMBR due to reversing the flow at a COD loading rate of 17 g/L/d.
Figure 5:
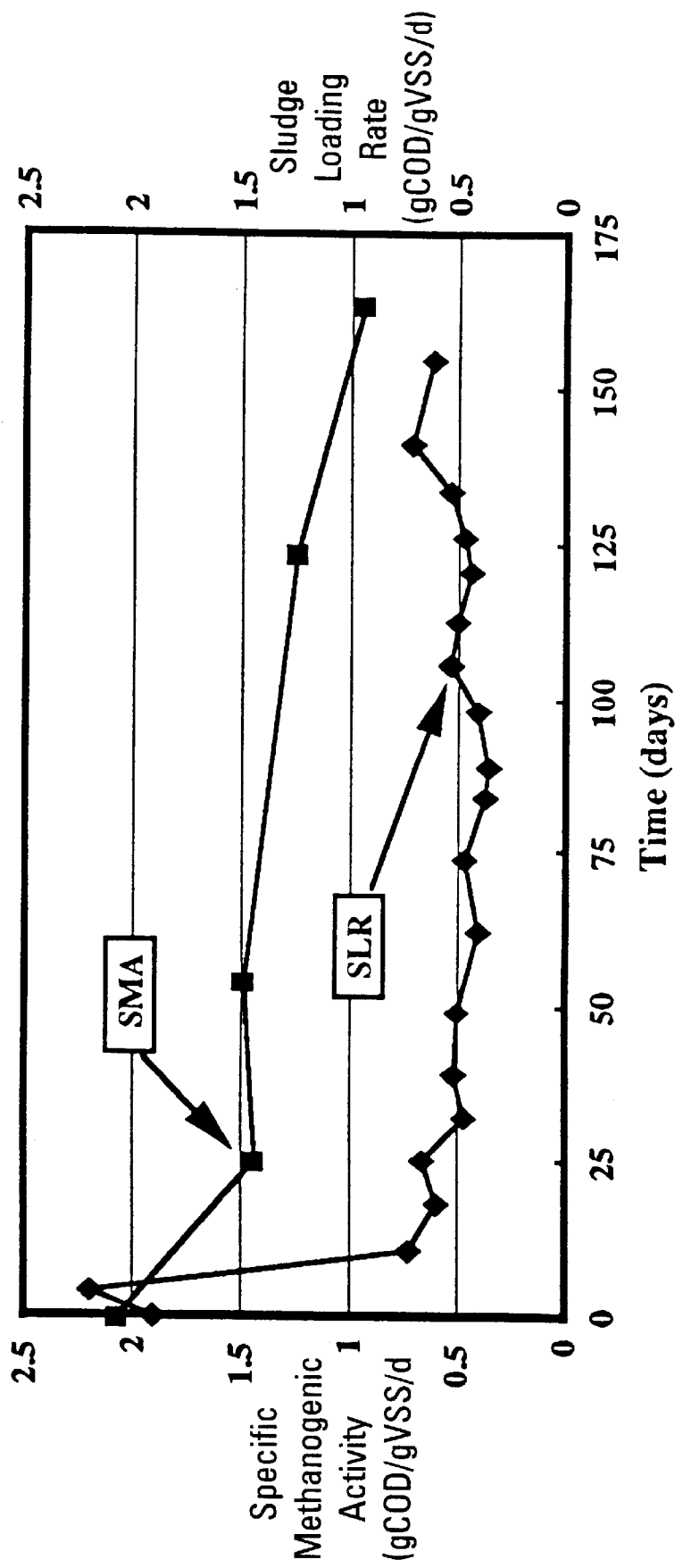
FIG. 5 is a graphical representation showing the specific methanogenic activity of the biomass and sludge loading rate for the 54-liter AMBR.

The performance of the 54-liter AMBR is shown in FIG. 2. Baffles between the compartments, instead of openings in the bottom of the inside walls, were placed in the 54-liter AMBR at day 76. This reduced short-circuiting and thus increased the soluble COD removal efficiency (SCOD removal) to 99% up to a loading of 23 gCOD/L/d. The data for the measured total COD removal efficiencies (measured TCOD removals) was obtained with COD tests. During most of the operational time, the calculated TCOD removal followed the same trend as the measured TCOD removal, as it should. However, placing baffles between the compartments decreased migration of biomass, which resulted in biomass accumulation and higher measured TCOD removals. At a COD loading rate of 23 g/L/d the calculated TCOD removal was around 80%. But, maximum COD loading rates were reached for these operational conditions, since further increase in the COD loading rate showed a severe decrease in TCOD and SCOD removals. To prevent unstable performances, the COD loading rate was decreased to 20 g/L/d and the number of reversals was increased to three times per day. After calculated TCOD removals were satisfying again, the reactor was shut down. The SMPR was 6 L/L/d at a COD loading rate of 23 g/L/d for the 54-liter AMBR, as can be seen in FIG. 3. The same figure also shows the increase in suspended solids levels over the operational time. Although the MLVSS is not a true measure of the biological active mass in the reactor, it is clear that biomass levels were increasing over time. At the end of operation, the MLVSS in the reactor was 40 g/L. In addition, an increase in the MLVSS was observed after placing baffles between the compartments at day 76. Even, at a COD loading rate of 23 g/L/d and a SMPR of 6 L/L/d, the 54-liter AMBR was able to retain its biomass. The individual VFAs in the compartments of the 54-liter AMBR at a COD loading rate of 17 g/L/d are shown in FIG. 4. Samples were taken to examine the VFA concentrations during reversing the flow. Initially the right compartment was fed, but became the final compartment after two hours of feeding the middle compartment. After the left compartment became the initial compartment the VFA concentrations were increasing rapidly. Simultanuously, VFA concentrations in the right compartment were decreasing, showing VFA gradients in the AMBR. Moreover, propionic acid concentrations were high in the initial compartment but leveled off in the final compartments. The pH in the initial compartment was always higher than 6.2 to prevent phase separation. However, pH levels of the final compartments were significantly higher compared with the initial compartment. The SMA of the biomass in the 54-liter AMBR decreased over the operational time, as can be seen in FIG. 5. The seed biomass which originated from the 12-liter AMBR, had a higher SMA because it was developed at a sludge loading rate (SLR) of 1.9 gCOD/gVSS/d (FIG. 5). However, the SLR was only around 0.5 gCOD/gVSS/d for the 54-liter AMBR because of higher biomass concentrations, as can be seen by comparing FIG. 3 and 7. Because of a decrease in SLR of the biomass, the SMA decreased over time. In order to increase the SMA it is thought to increase the SLR by wasting biomass periodically and keeping the MLVSS around 25 g/L. Significant differences in SMA of biomass between the compartments were not detected.

Figure 6:
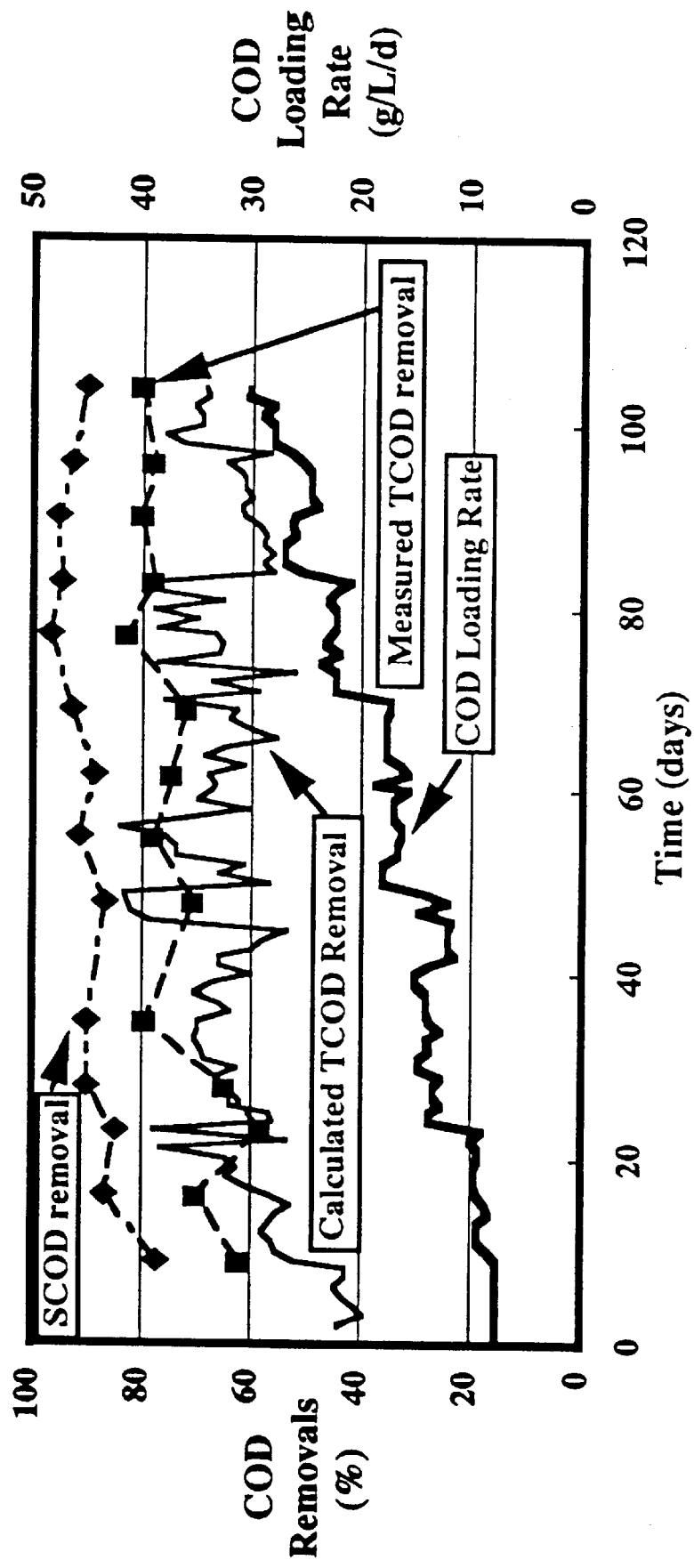
FIG. 6 is a graphical representation showing the COD removal efficiencies and loading rates for the 12-liter AMBR.
Figure 7:
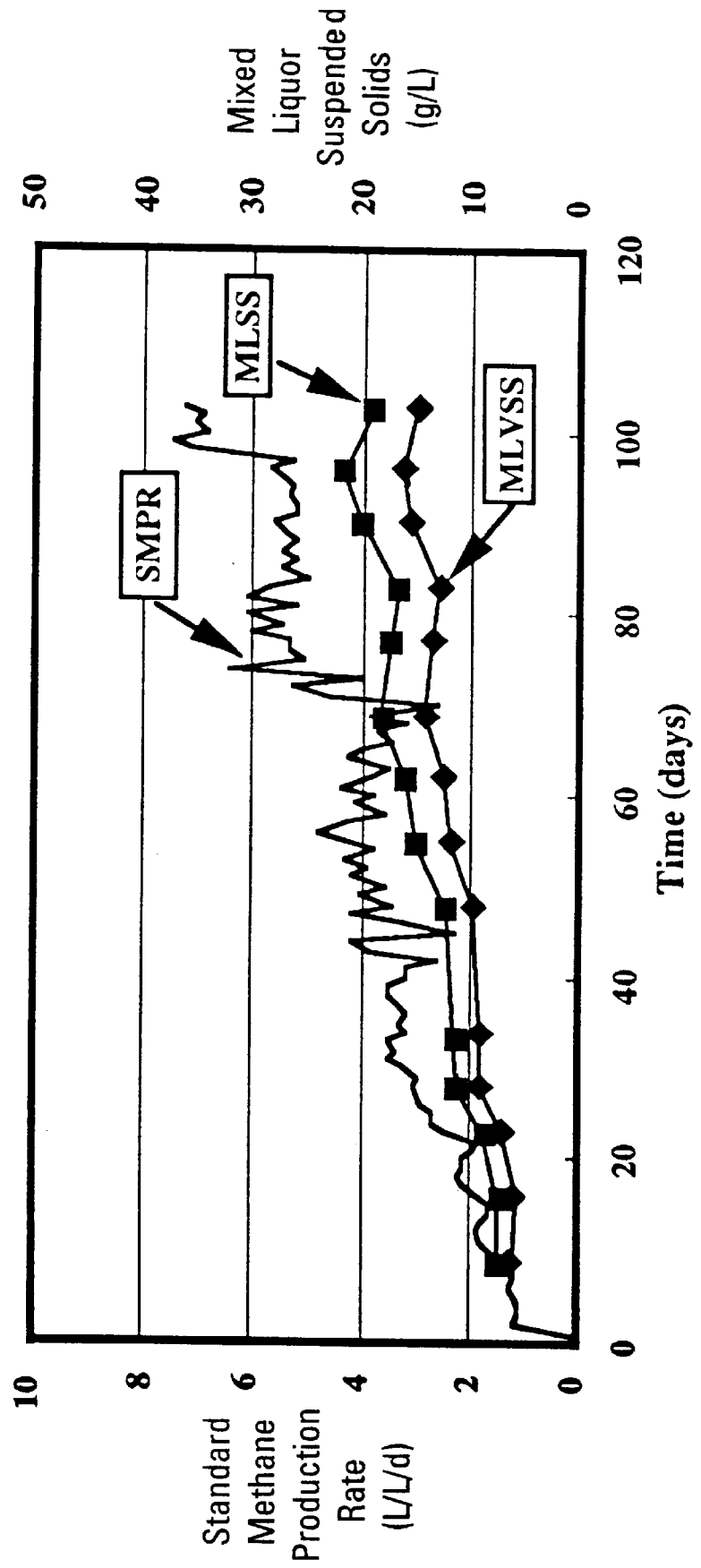
FIG. 7 is a graphical representation showing the standard methane production rate and mixed liquor suspended solids for the 12-liter AMBR.

The performance of the 12-liter AMBR is shown in FIG. 6. Over the operational time, the COD loading rate was increased to 30 g/L/d. At this high COD loading rate, the SCOD removal was 90%, which shows that maximum COD loading rates were reached for these operational conditions. At this COD loading rate the calculated TCOD removal was around 70%. The SMPR of the 12-liter AMBR was approximately 7 L/L/d at a COD loading rate of 30 g/L/d, as can be seen in FIG. 7. Because of a high migration of the granular biomass in the 12-liter AMBR the flow had to be reversed three times a day, but the MLVSS did not exceed 16 g/L, as can be seen in FIG. 7. The 12-liter AMBR was operated at SLRs which exceeded 1.5 gCOD/gVSS/d. Even at COD loading rates higher than 25 g/L/d, the 12-liter AMBR was able to retain its granular biomass.

Figure 8:
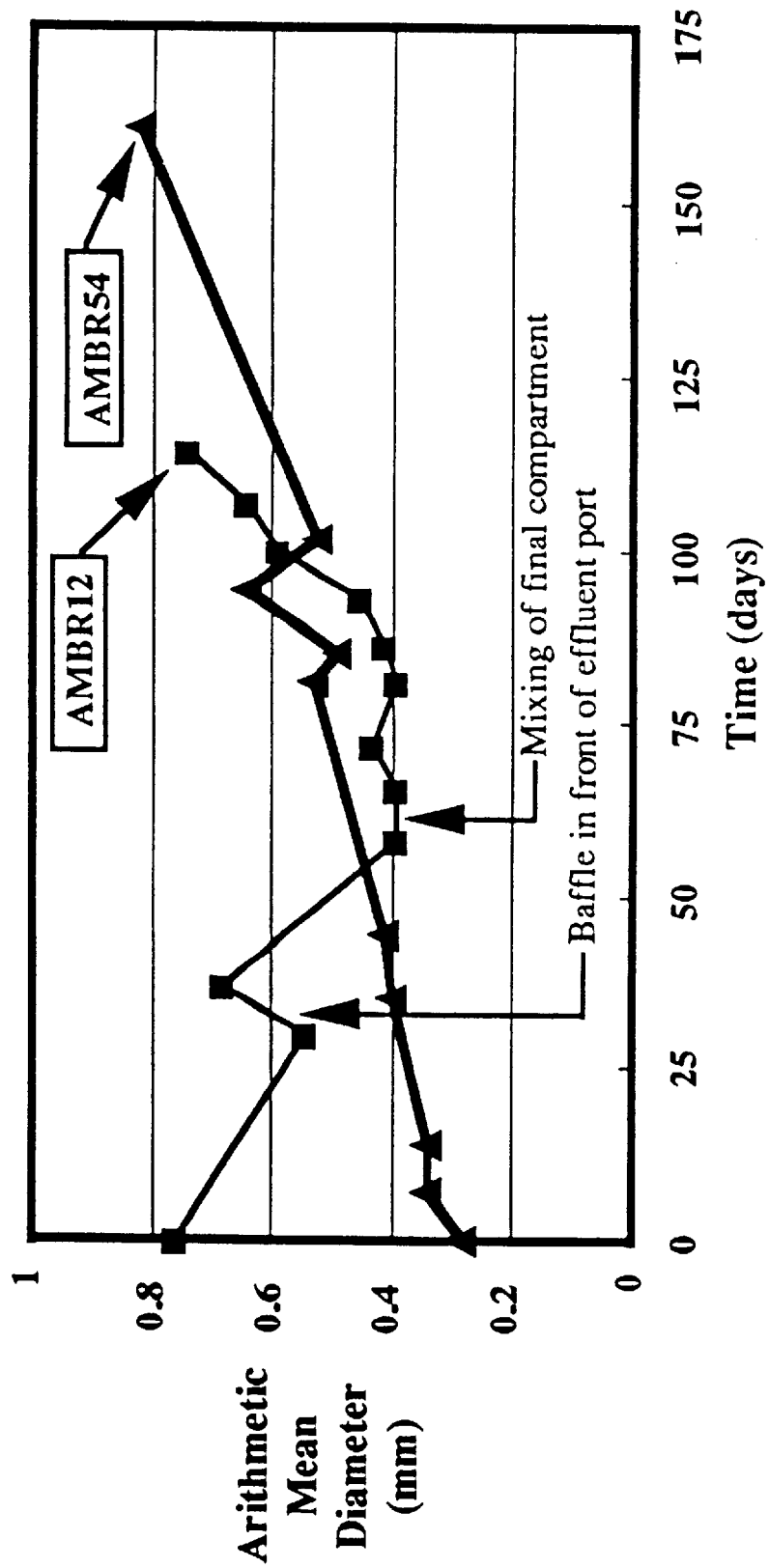
FIG. 8 is a graphical representation showing the arithmetic mean diameter of the granules for the AMBR systems.

The AMBR was capable of maintaining and growing a highly settleable granular biomass, which resulted in an increase in the granule size over the operational time, as can be seen in FIG. 8. At the end of operation, the arithmetic mean diameter of the granules in the 12-liter and 54-liter AMBR were 0.74 and 0.82 mm, respectively. At the start of operation of the 12-liter AMBR, it was noticed that flocculent biomass would accumulate in the final compartment whenever the final compartment was not mixed. After starting intermittent mixing of the final compartment, the flocculent biomass washed out of the AMBR with the effluent, slowly increasing the arithmetic mean diameter of the biomass. Moreover, placing baffles in front of the effluent ports prevented floating granules of washing out of the AMBR. The sludge volume index (SVI) of the granular biomass of the 54-liter AMBR was 16.3 mL/gVSS at the end of the operation.

Comparison of the AMBR, UASB reactor, and the ASBR

Figure 9:
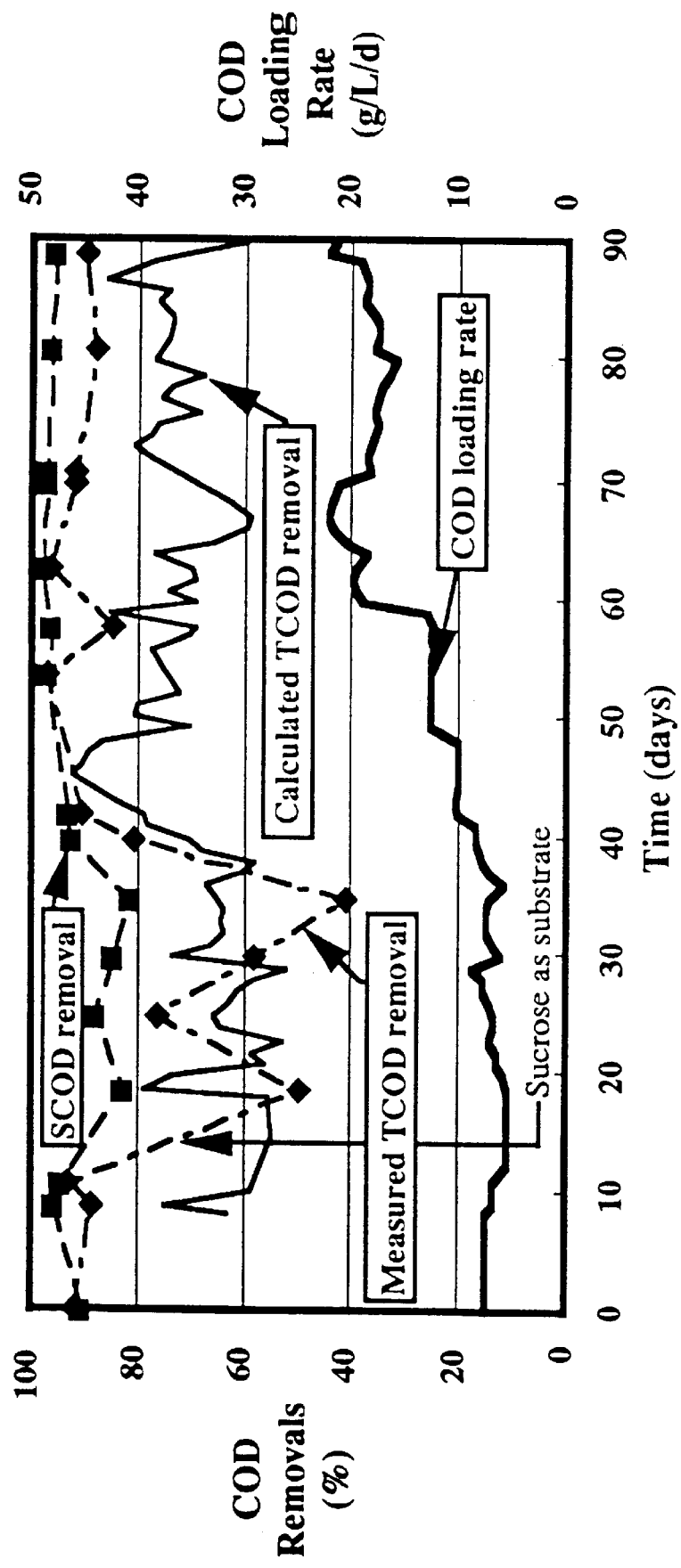
FIG. 9 is a graphical representation showing COD removal efficiencies and loading rates for the 12-liter upflow anaerobic sludge blanket (UASB) reactor.
Figure 10:
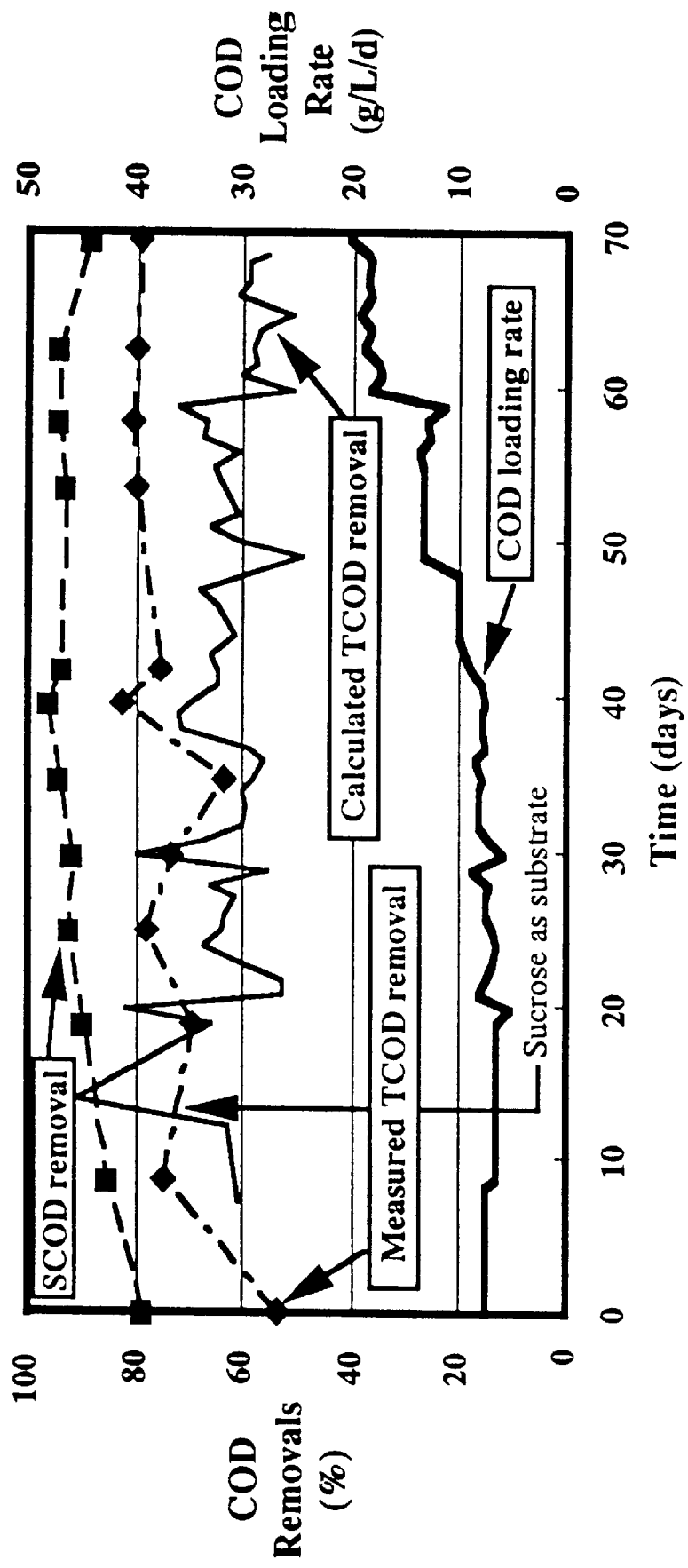
FIG. 10 is a graphical representation showing COD removal efficiencies and loading rates of the 12-liter anaerobic sequencing batch reactor (ASBR)

All laboratory-scale reactors were operated in the same way in order to compare the reactor performances. FIGS. 9 and 10 show reactor performance of the UASB reactor and ASBR, respectively. For the UASB reactor, the SCOD removal was exceeding 95% at a COD loading rate of 20 g/L/d. However, due to formation of a more fluffy granular biomass in the UASB reactor, at these COD loading rates, rising of the entire blanket prevented an increase in the load. Moreover, an increase of the COD loading rate resulted in lower calculated TCOD removals, as is shown in FIG. 9. Also, unstable conditions were noticed after the synthetic waste of the 12-liter UASB reactor was changed from NFDM to sucrose at day 14. However, the performance significantly improved at day 40. Deterioration of the performance due to this change in synthetic waste was not detected for the 12-liter ASBR. At the end of the operational time, the calculated TCOD removal of the ASBR was decreasing to 60% at a COD loading rate of 19 g/L/d. Therefore, it was concluded that the maximum COD loading rate was achieved at these operational conditions. Both, the 12-liter UASB and ASBR process achieved lower maximum COD loading rates compared with the 12-liter AMBR, which achieved a COD loading rate of 30 g/L/d.

TABLE II

Comparison of the AMBR, UASB reactor, and ASBR at a COD loading rate of 20 g/L/d

| Parameters of performance | (.) | AMBR54 | AMBR12 | UASB | ASBR |
| --- | --- | --- | --- | --- | --- |
| at a COD loading rate of | (g/L/d) | 21 | 21 | 19.5 | 18.9 |
| HRT | (d) | 0.5 | 0.5 | 0.5 | 0.5 |
| MLVSS | (g/L) | 40 | 13 | 12 | 30 |
| Sludge retention time (SRT) | (d) | 15 | 5 | NA | 6 |
| SLR | (g/g/d) | 0.5 | 1.6 | 1.6 | 0.6 |
| Effluent VFA | (g/L) | 0.075 | 0.19 | 0.120 | 0.360 |
| SCOD removal | (%) | 99 | 95 | 97 | 94 |
| Calculated TCOD removal | (%) | 76 | 78 | 70 | 59 |
| SMPR | (L/L/d) | 5.6 | 5.7 | 4.8 | 3.9 |
| Arithmetic mean diameter | (mm) | 0.82 | 0.74 | 2.9 | 0.8 |
| Maximum COD loading rate | (g/L/d) | 23 | 30 | 21 | 19 |

The reactor performances of the AMBR, UASB reactor, and ASBR at a COD loading rate of approximately 20 g/L/d are shown in Table II in order to make a comparison. Calculated TCOD removals were 76% and 78% for the AMBR, compared with 70% and 59% for the UASB reactor and ASBR, respectively. The SCOD removal of 99% for the 54-liter AMBR was higher compared with the UASB process (97%). The SCOD removal of the 54-liter AMBR was also higher than for the 12-liter AMBR, which was a result of less short-circuiting. Due to a high retention of biomass in the UASB reactor, surplus biomass had to be removed on day 62, 77, and 85, not to plug the gas-solids-separator system. However, surplus biomass was automatically washed out of the AMBR and ASBR systems. Accumulation of biomass in the UASB reactor was responsible for a smaller difference between the SCOD and measured TCOD removals, as can be seen in FIG. 9. The arithmetic mean diameter of the biomass in the UASB reactor was much higher than in the AMBR and ASBR systems. Also, granules in the AMBR and ASBR systems tended to be more dense than granules in the UASB reactor, which were visually more fluffy.

DISCUSSION

The compartmentalized AMBR achieved high removal efficiencies and was able to maintain high suspended solids levels in the reactor even at high COD loading rates. Due to mechanical mixing, biogas production, and the absence of recycling, the AMBR may be characterized as a series of completely mixed compartments, which approaches plug-flow conditions. VFA concentrations in the compartments (FIG. 4) and the pH gradient over the length of the reactor confirmed these plug-flow conditions. Moreover, the "feast" and "famine" conditions for the biomass in the AMBR process resulted in high substrate utilization rates in the initial compartment followed by low substrate utilization rates in the final compartment. Low substrate concentrations in the final compartment are responsible for enhanced internal settling of the granular biomass and for a high treatment efficiency. However, due to recycling and biogas production, the UASB reactor approaches CSTR conditions [15]. Moreover, the ASBR is a batch-fed system with the same advantages as a plug-flow reactor, but approaches CSTR conditions during feeding, as was discribed by Sung and Dague [28]. Therefore, from a strictly kinetic standpoint, the AMBR performance is superior to both the UASB reactor and ASBR, because with chemical reactions of the first or higher order, reactors with a plug-flow pattern are more effective than completely mixed reactors [21]. However, a very good biomass/substrate contact due to gentle, continuous mixing conditions in the UASB reactor could be the explanation for the comparable performance of the UASB reator. The performance of the ASBR was limited by high VFA concentrations and resulting low pH values just after feeding the substrate. Therefore, shorter feed/decant cycles and a longer feeding period per cycle could have resulted in more favourable conditions in the reactor.

Methanogenesis in the initial compartment of the AMBRs was maintained by keeping the pH higher than 6.2 due to reversing the flow, without having to recycle or to add enormous amounts of buffer. In this way, the AMBR process prevented the acidogenic bacteria from becoming abundant. Additionally, ideal conditions for the methanogens were created and fluffy acidogens were quickly washed out of the system after the initial compartment became the final compartment. Furthermore, granules in the UASB-reactor tended to be more fluffy, while granules in the AMBR and ASBR seemed to be smaller and more dense due to higher shear forces and grazing of the acidogens. A resulted wash out of the filamentous acidogens for the ASBR and AMBR could be the explanation for the bigger difference in SCOD and measured TCOD removal compared with the UASB-reactor, even before surplus biomass was formed in the AMBR and ASBR systems, as can be seen in FIGS. 2, 6, 9, and 10 [38]. The fluffy granules in the UASB reactor have created problems like bulking and rising of the blanket. Alphenaar [1] mentioned that in order to avoid these problems in the UASB process, pre-acidification of sucrose is necessary. Furthermore, Alphenaar [1] found that for non-acidified sucrose a maximum SLR of 0.6 gCOD/gVSS/d can be applied. Not surprisingly, fluffy biomass was found in the 12-liter UASB which was operated at a SLR of 1.6 gCOD/gVSS/d. Next, a SLR of only 0.6 gCOD/gVSS/d in the 12-liter ASBR could be responsible for not having biomass flotation limitations. However, no bulking or biomass flotation due to acidogenic bacteria was found in the 12-liter AMBR wich was also opearated at SLRs of 1.6 gCOD/gVSS/d. Thus, it is more likely that higher shear force and biomass wash-out in the ASBR was responsible for the absence of problems associated with acidogenic bacteria. Therefore, the AMBR and ASBR systems are not dependable on a pre-acidification step. Fox and Pohland [13] have postulated that different wastewaters have different needs for pre-acidification. Therefore, the change from NFDM to sucrose, as the synthetic substrate, could have changed the microbial population towards the growth of filamentous acidogens and the formation of a more fluffy granular biomass in the 12-liter UASB reactor.

At high COD or hydraulic loading rates (HLRs), the migration of the biomass needs to be controlled in order to limit the amount of reversing the flow. At increased COD loading rates the higher biogas production will increase turbulence in the initial compartments, increasing the BMR. Bigger openings in the bottom of the inside walls or placement of baffles between compartments have reduced the BMR of the AMBR significantly. Openings in the bottom of the walls between the compartments could be used for systems with a long HRT. When the HRT is short, baffles should be used in order to reduce migration and to prevent the substrate from short circuiting in the reactor. It should be realized that the BMR should be as high to migrate flocculent biomass in order to select for a granular biomass. But, migration of granular biomass is not totally necessary. This could result in staging of the biomass in which relatively more acidogens are present in the outer compartments. However, when wastewater contains solids, a high BMR is required for washing out these solids in order to prevent accumulation.

The maximum COD loading rate for the 54-liter AMBR was found to be lower compared with the 12-liter AMBR. This could have been the result of a longer interval time between reversing the flow for the 54-liter AMBR. The flow was reversed once and three times per day for the 54-liter and the 12-liter AMBR, respectively. Therefore, the pH in the initial compartments of the 54-liter AMBR could have been more favourable at a shorter interval of time. Moreover, reversing the flow is probably responsible for higher removal efficiencies of the AMBR compared with the compartmentalized ABR. Bachman et al. [7] found a SMPR exceeding 6 L/L/d at a COD loading rate of 36 g/L/d for the ABR treating sucrose, while the 12-liter AMBR achieved a SMPR of 7 L/L/d at a lower COD loading rate of 30 g/L/d. The length of time between reversing the flow of the AMBR is limited by either the HLR or the COD loading rate. This results, for the first limitation, in biomass levels in the initial compartment becoming the limiting factor, especially at a low HRT for low-strength wastewater. At higher COD loading rates, the pH and the VFA concentration in the initial compartment can become the limiting factor, since the VFA production will take place mainly in the initial compartment. This indicates that biomass levels or the pH in the initial compartment could be used to determine the length of time between the reversals of flow in order to obtain optimal operating conditions. The length of the interval of time for the TSU-AN system was found to be limited by the HLR and was normally between 90 and 180 minutes [9].

If operated semi-continuously, the AMBR system could consist of a minimum of two compartments. However, if plugflow conditions are desired, three, four or even five compartments could imply more favourable conditions for operation of the AMBR process. The choice of the design for this new reactor type will be heavily dependent on the wastewater conditions and cost factors. Possible advantages of more than three compartments are smaller BMRs, less chance of short-circuiting, and operation in a step feed mode for high strength wastewaters to prevent shock loadings. Also, more difficult compounds like intermediates such as propionate will find a more optimal environment for degradation. Therefore, a staged process could provide higher process stability, as has been postulated by Van Lier et al. [31], especially at thermophilic conditions. Flamming et al. has found a high stability of the AMBR during shock-load conditions and has concluded that compartmentalization of the gas-phase could be beneficial [12]. A "stripping effect" of formed intermediates, like hydrogen and free sulfide in the initial compartments might minimize eventual inhibition effects on acetogenic and methanogenic conversions in the final compartments. Especially for wastewaters with a high sulfate concentration, this could be important. Due to acid formation, the pH will be relatively low in the initial compartments while most of the sulfate will be reduced in these compartments. As a result, mainly all produced free sulfide will be stripped from the solution in the initial compartments and $H_2S$ concentrations can be fairly low in the final compartments [33].

CONCLUSIONS

In terms of stabilization of organic matter, the laboratory-scale AMBR was highly efficient with SCOD removals of 99% up to loadings of 23 gCOD/L/d at an HRT of 12 hours for the 54-liter AMBR, which resulted in a SMPR of six L/L/d. A SMPR of seven L/L/d was found for the 12-liter AMBR at a COD loading rate of 30 g/L/d after 110 days of operation with sucrose as a synthetic waste. However, soluble COD removals were 95% for the 12-liter AMBR. Moreover, baffles between the compartments in the 54-liter AMBR prevented short-circuiting and slowed the migration of biomass in the reactor. Therefore, the performance of the AMBR was superior to both the UASB reactor and ASBR with regard to maximum COD loading rates, SMPR, and SCOD removals.

The AMBR was capable of maintaining and growing a highly settleable granular biomass, which resulted in an increase in the arithmetic mean diameter of the granules over the operational time. Both intermittent mixing of the final compartment and baffles in front of the effluent port, had a positive effect on the selection pressure. Granules in the AMBR and ASBR systems tended to be smaller and more dense than granules in the UASB reactor, which were more fluffy due to the presence of filamentuous acidogens. Problems related to the fluffy biomass, like bulking and biomass flotation, were detected in the UASB-reactor. However, the absence of these problems in the ASBR and AMBR makes pre-acidification not necessary. Moreover, the AMBR was able to maintain high levels of biomass (40 gMLVSS/L) even at high COD loading rates up to 23 g/L/d for the 54-liter AMBR. But biomass levels need to be controlled for an operational standpoint.

EXAMPLE 2

INTRODUCTION

Laboratory-scale AMBRs have shown good performances at chemical oxygen demand (COD) loading rates of up to 30 g/L/d when fed non-acidified sucrose as a synthetic substrate [3]. Furthermore, treatability studies of wastewater from a paper recycling company using a 20 liter AMBR has resulted in soluble COD (SCOD) removal efficiencies exceeding 80% with an hydraulic retention time (HRT) of eight hours [12]. These AMBRs, which were seeded with granular biomass, were able to grow and maintain granular biomass. However, research on granulation in AMBRs with a flocculent seed would gain more insight into the selection process. Thus, the objective of this research was to study the selection process of granular biomass and start-up of the AMBR seeded with primary digester sludge.

The AMBR is a continuously fed, compartmentalized reactor that reverses its flow in an horizontal matter. Since there is no hydraulic upflow pattern present in the reactor, no elaborate gas-solids-separator and feed-distribution systems are required. However, to create sufficient substrate/biomass contact, intermittent mixing is necessary. Plug-flow conditions are enhanced by the absence of recycling, and by offsetting mixing effects of gas production in a compartmentalized reactor [13]. The plug-flow conditions of the AMBR create a substrate gradient over the horizontal plain of the reactor; with high substrate concentrations in the initial compartments and the lowest substrate concentration in the final compartment. This will not only result in high removal efficiencies, but also create an ideal solid/liquid clarification zone in the final compartment were lowest gas production was observed. Moreover, plugflow conditions will promote phase separation, as has been documented by Fox and Pohland [13]. However, total phase separation in the AMBR process will be prevented by reversing the flow over the horizontal plain of the reactor [3]. The advantage of using slight pre-acidification in a staged process, over a two-phase treatment concept has already been postulated by Lettinga [20]. Studies by Morvai et al. [23] have revealed that the microbial selection of microorganisms that promote granulation can occur at very low (0–0.2 g/L acetate) or much higher substrate concentrations, indicating that granulation can occur in plug-flow systems from a strictly kinetic view. A key to the hydraulic selection of granular biomass in the AMBR process, and thus the reactor performance, is the migration of the blanket through the reactor. A higher rate of migration of flocculent biomass, compared with granular biomass, is responsible for the wash out of less settleable, flocculent biomass. In this way, the formed aggregates are retained in the reactor and grow in size [3]. However, reversing the flow is required to prevent biomass from accumulating in the final compartment due to migration of the blanket. Several anaerobic processes, like the upflow anaerobic sludge blanket (UASB) process and its derivatives are dependent on the use of an hydraulic upflow pattern for a selection process that obtains granular biomass [20]. However, Sung and Dague [27], and Vanderhaegen et al. [30] have shown that granulation is not solely dependent on an hydraulic upflow pattern in the reactor.

MATERIALS AND METHODS

A 54-liter AMBR was placed in a constant temperature room at 35° C. (+/−1° C.). Concentrated substrate, consisting of sucrose plus essential nutrients (C/N ratio was 16), alkalinity, yeast extract, and trace-elements [37, 32], was stored in a refrigerator to prevent pre-acidification, and was mixed to obtain a constant loading rate. Furthermore, make-up water (35° C.) was added to the substrate before feeding to the reactor. The influent COD concentration was changed from 10 to 2 g/L after 145 days of operation. The reactor was seeded with flocculent primary digester sludge from the wastewater pollution control plant of the city of Ames, Iowa, USA. The active volume of the laboratory-scale AMBR was 54 liter and was divided into three compartments, as illustrated in FIG. 1. A minimum of three compartments was required for the AMBR in order to feed the middle compartment for a certain amount of time before the flow was reversed. In this way, a break-through of substrate could be prevented. Therefore, the middle compartment was fed for two hours between reversing the flow. During the operational time, the flow was reversed three times per day. Sufficient biomass/substrate contact was maintained using intermittent, gentle mixing. In this study, the initial compartments were mixed equally for 15 seconds every 15 minutes. However, the final compartment was not mixed during the first 100 days of operation in order to build up biomass. After 100 days of operation, the final compartment was mixed every half hour in order to increase the selection pressure for granules. Slanting baffles were placed in front of the effluent ports so as not to wash out floating degasifying granules. The methods have been described previously by Angenent and Dague [3]. Moreover, the specific methanogenic activity (SMA) of the biomass was performed according to Rinzema et al. [24].

RESULTS AND DISCUSSION

Figure 11:
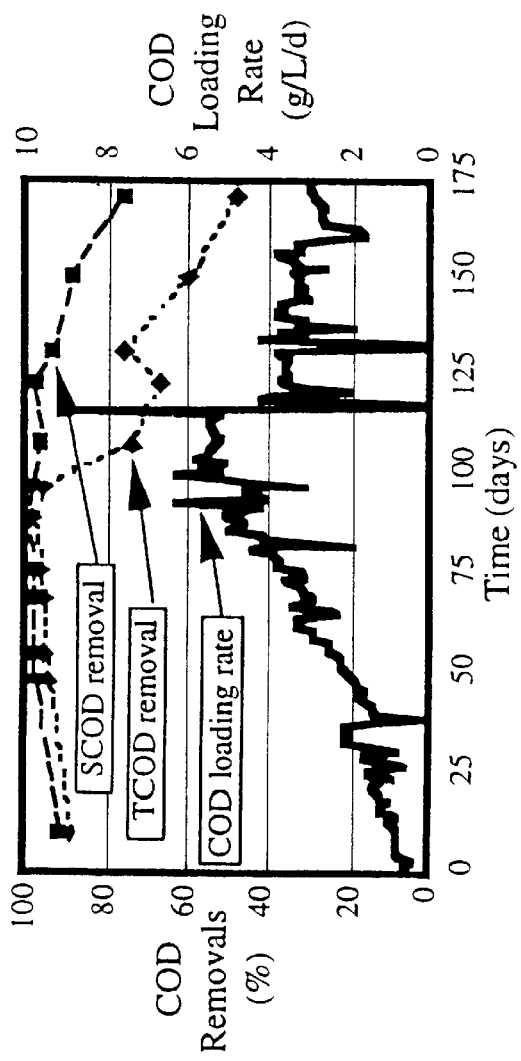
FIG. 11 is a graphical representation showing the COD removals and loading rate over time for the 54-liter AMBR of Example 2.
Figure 12:
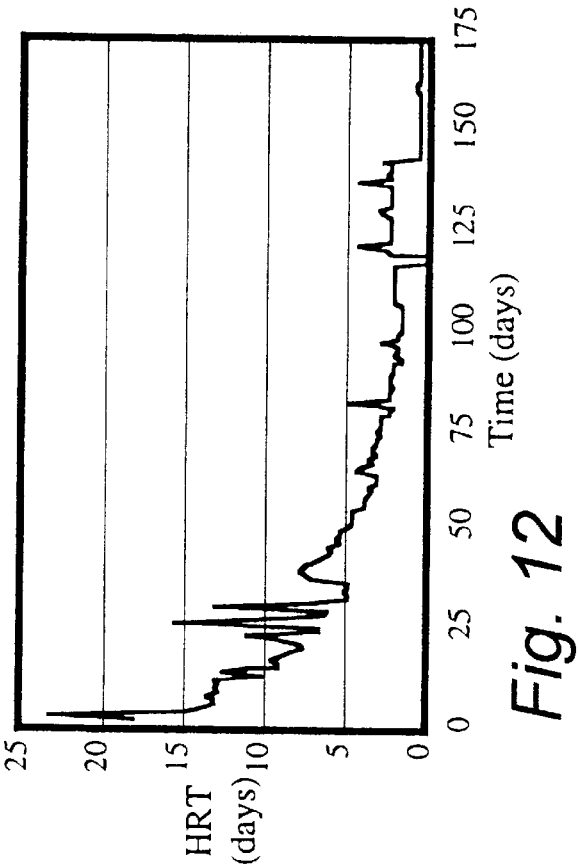
FIG. 12 is a graphical representation showing the variation of HRT over time for the AMBR of Example 2.
Figure 13:
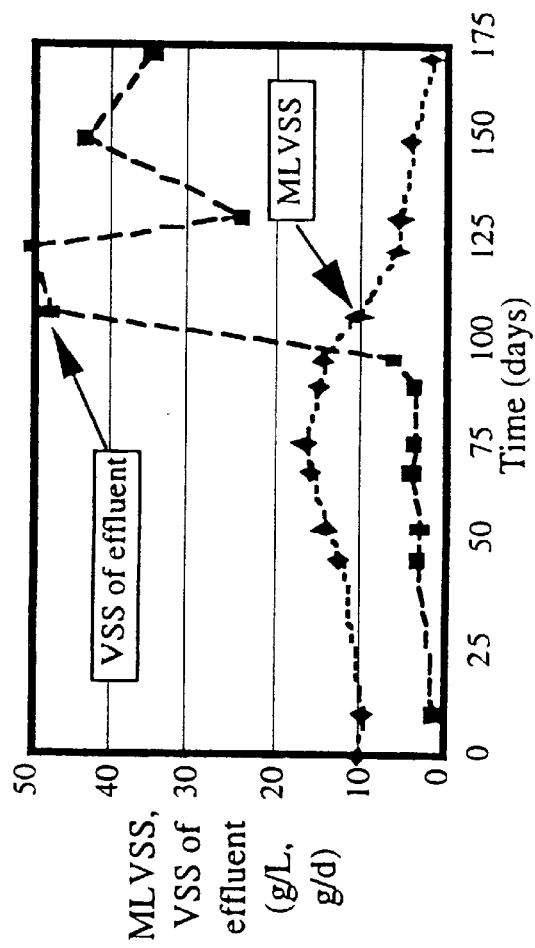
FIG. 13 is a graphical representation showing MLVSS an VSS of effluent over time for the AMBR of Example 2.
Figure 14:
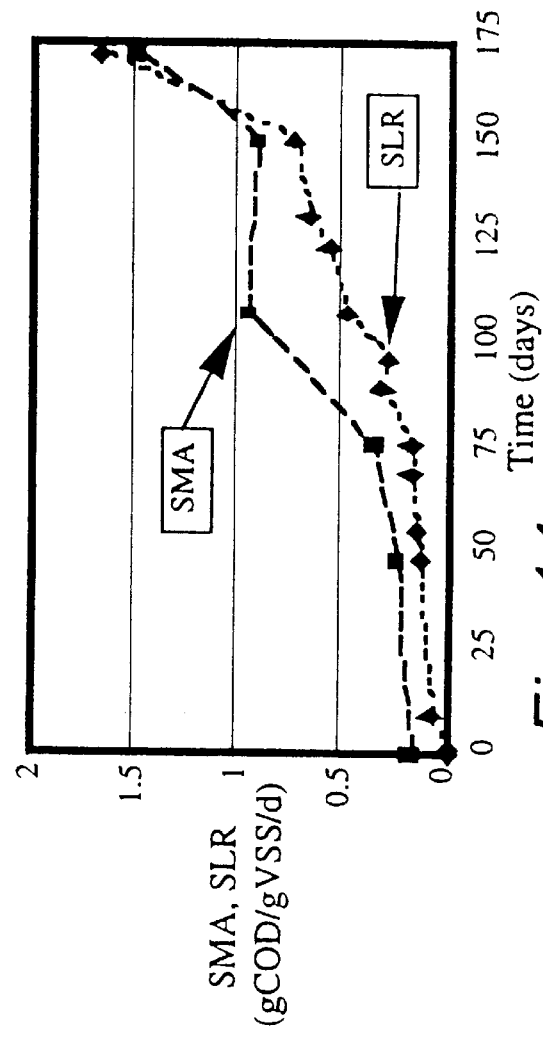
FIG. 14 is a graphical representation showing the variation of SMA and SLR for the AMBR of Example 2.

During start-up, the 54-liter AMBR was fed with an influent concentration of 10 gCOD/L at a long HRT and mixing was omitted in the final compartment. The system had a low hydraulic selection pressure which resulted in an efficient solid/liquid separation. This is shown in FIG. 13 by an increase in the mixed liquor volatile suspended solids (MLVSS) of up to 16 g/L and a low effluent volatile suspended solids (VSS) content. Simultaneously, the COD loading rate was increased to 5.5 g/L/d over a 90 day period with high COD removal efficiencies, as can be seen in FIG. 11. However, a flocculent acidogenic sludge accumulated with decreasing settleability, which resulted in a sludge volume index (SVI) of 90 mL/gVSS. Several authors have noticed this problem in sucrose-fed UASB reactors whenever the hydraulic selection was not adequate to separate bulking sludge from heavier biomass [26, 18]. After 100 days of operation, the selection pressure was increased by intermittently mixing the final compartment. Although the MLVSS decreased, the hydraulic selection pressure was still inefficient to select for a less fluffy biomass. Only after the influent COD concentration was decreased to 2 g/L and, simultaneously, the HRT was shortened five times to 12 hours, was the hydraulic selection pressure adequate to wash out all fluffy biomass. As a result, the MLVSS decreased to 1.5 g/L and the sludge loading rate (SLR) increased to 1.6 gCOD/gVSS/L, as can be seen in FIG. 13 and 14. Therefore, the COD loading rate had to be decreased to 3 g/L/d because of unstable conditions. After 150 days of operation, white, light gray, and amber coloured granules were noticed in the reactor. Scanning electron microscope (SEM) views of granules after 175 days of operation showed no noticeable fluffy biomass. At this point in time, the SMA of the biomass had increased from 0.18 to 1.5 gCOD/gVSS/d, as can be seen in FIG. 14. Further operation of the reactor, which is not included in this paper, resulted in an increase in the MLVSS and the COD loading rate. The AMBR had the ability to select better settleable biomass by introducing different levels of selection pressures. The selection pressure was described as a combination of hydraulic pressure and COD loading conditions, which needed to be high in order to wash out dispersed flocculent biomass [18]. However, the selection pressure needed to be lower at the start of the operation to achieve higher COD loading rates, but still high enough to prevent the build up of flocculent acidogenic biomass. In this study, the selection pressure at the start of operations was inefficient. Mixing scheme and hydraulic loading rates were changed to manipulate the selection pressure. In addition, a change in configuration of the AMBR could increase the selection pressure by increasing the biomass migration rate in the reactor. This could be done by placing openings in the bottom of the walls between the compartments instead of the baffles between the compartments. More research will be conducted with changes in the reactor configuration and the synthetic substrate to a mixture of sucrose and volatile fatty acids. It is believed that this will shorten the time in which granules occur on a high strength carbohydrate waste significantly, which will also speed up the start-up period of the AMBR.

CONCLUSIONS

It was concluded that granules can be formed in the AMBR seeded with primary digester sludge and fed a carbohydrate substrate. However, changes in operation or reactor configuration are needed to increase the selection pressure for granulation and shorten the start-up period.

EXAMPLE 3

ABSTRACT

The AMBR can achieve high loading rates with a short start-up period, when seeded with a highly settleable granular biomass. However, in places where granular biomass is not available, alternative biomass sources are used. In this start-up example, a 54-liter AMBR was seeded with primary digester sludge and fed a synthetic substrate of non-acidified sucrose. Biomass concentration in the AMBR successfully built up to 16 gMLVSS/L in a three month period. Simultaneously, the COD loading rate was increased from 0.5 to 5.5 g/L/d. In this example, the system was operated at low hydraulic selection pressures in which dispersed flocculent sludge was not washed out significantly.

INTRODUCTION

High concentrations of biomass made the AMBR a high rate process since the hydraulic retention (HRT) and sludge retention time (SRT) were uncoupled. Other high rate processes have been developed and successfully applied for several wastestreams, like the upflow anaerobic sludge blanket (UASB) reactor and the anaerobic sequencing batch reactor (ASBR) [19, 27]. These anaerobic systems have shown several advantages when compared to conventional aerobic treatment systems. Advantages are the production of useful energy in the form of biogas and the higher space loading rates obtained which resulted in smaller space requirements. Furthermore, the volume of excess sludge produced is significantly lower and is well stabilized, and anaerobic organism can be preserved unfed for a long time [20]. Laboratory-scale AMBRs have shown good performances at chemical oxygen demand (COD) loading rates of up to 30 g/L/d when fed non-acidified sucrose as a synthetic substrate [3]. Furthermore, treatability studies of wastewater from a paper recycling company using a 20 liter AMBR resulted in soluble COD (SCOD) removal efficiencies exceeding 80% with an hydraulic retention time (HRT) of eight hours [12]. These AMBRs, which were seeded with granular biomass, were started at high COD loading rates and were able to retain its biomass. However, in places where granular biomass is not available, alternative biomass sources are used [20]. This example presents the results of a 54-liter AMBR seeded with primary digester sludge in which no granules were selected. In this way the maximum COD loading rate of the AMBR which contained less settleable biomass was studied. The AMBR is a continuously fed, compartmentalized reactor that reverses its flow in an horizontal matter. Since there is no hydraulic upflow pattern present in the reactor, no elaborate gas-solids-separator and feed-distribution systems are required.

However, to create sufficient substrate/biomass contact, intermittent mixing is necessary. Plug-flow conditions are enhanced by the absence of recycling, and by offsetting mixing effects of gas production in a compartmentalized reactor [13]. The plug-flow conditions of the AMBR create a substrate gradient over the horizontal plain of the reactor; with high substrate concentrations in the initial compartments and the lowest substrate concentration in the final compartment. This will not only result in high removal efficiencies, but also create an ideal solid/liquid clarification zone in the final compartment were lowest gas production was observed. Moreover, plugflow conditions will promote phase separation, as has been documented by Fox and Pohland [13]. However, total phase separation in the AMBR process will be prevented by reversing the flow over the horizontal plain of the reactor [3]. The advantage of using slight pre-acidification in a staged process, over a two-phase treatment concept has already been postulated by Lettinga [20]. A key to the hydraulic selection of granular biomass in the AMBR process, and thus the reactor performance, is the migration of the blanket through the reactor. A higher rate of migration of flocculent biomass, compared with granular biomass, is responsible for the wash out of less settleable, flocculent biomass. In this way, the formed aggregates are retained in the reactor and grow in size [3]. However, reversing the flow is required to prevent biomass from accumulating in the final compartment due to migration of the blanket. The AMBR had the ability to select better settleable biomass by introducing different levels of selection pressures [4]. The selection pressure was described as a combination of hydraulic pressure and COD loading conditions, which needed to be high in order to wash out dispersed flocculent biomass [18]. However, the selection pressure needed to be lower at the start of the operation to achieve higher COD loading rates, but still high enough to prevent the build up of flocculent acidogenic biomass. The selection pressure in the AMBR was manipulated by changing the mixing scheme and the hydraulic loading rate [4].

MATERIALS AND METHODS

A 54-liter AMBR was placed in a constant temperature room at 35° C. (+/-1° C.). Concentrated substrate, consisting of sucrose plus essential nutrients (C/N ratio was 16), alkalinity, yeast extract, and trace-elements [37, 32], was stored in a refrigerator to prevent pre-acidification, and was mixed to obtain a constant loading rate (see Table III). Furthermore, make-up water (35° C.) was added to the substrate before feeding to the reactor. The influent COD concentration was 10 g/L. The reactor was seeded with flocculent primary digester sludge from the wastewater pollution control plant of the city of Ames, Iowa, USA. The active volume of the laboratory-scale AMBR was 54 liter and was divided into three compartments, as illustrated in FIG. 1. A minimum of three compartments was required for the AMBR in order to feed the middle compartment for a certain amount of time before the flow was reversed. In this way, a break-through of substrate could be prevented. Therefore, the middle compartment was fed for two hours between reversing the flow. During the operational time, the flow was reversed three times per day. Two automatic ball valves, with an internal diameter of one inch, were used to open and close effluent ports (True Blue Electric actuator model EBV-6, Plast-o-Matic Valves Inc., Cedar Groove, N.J., USA). The pH was monitored by probes in the reactor (pH-probe: Fermprobe pH-electrode (210 mm), Phoenix Electrode Co., Houston, Tex., USA; pH-controller: Model PHCN-425, Omega Engineering Inc., Stamford, Conn., USA). Sufficient biomass/substrate contact was maintained using intermittent mixing. Research by Dague et al. [10] showed that mixing that was too intense could destroy the anaerobic bioflocs. Mixers (Model 5vb, EMI Inc., Clinton, Conn., USA) were able to start and operate at a slow speed to ensure gentle mixing. Paddle mixing further enhanced gentle mixing. In this study, the initial compartments were mixed equally for 15 seconds every 15 minutes. However, the final compartment was not mixed in order to serve as a solid/liquid clarification zone. All pumps used, were Masterflex pumps of Cole Parmer Instrument Co., Chicago, Ill., USA. The gas collection systems consisted of an observation bottle, a bottle packed with steel wool to scrub hydrogen sulfide from the biogas, a gas sampling port, and a wet-test gas meter (GCA, Precision Scientific, Chicago, Ill., USA). The biogas was directly discharged from the reactor to the gas collection system. A water head was installed on the effluent tubes in order to prevent biogas from escaping with the effluent. Timers (ChronTrol Corporation, San Diego, Calif., USA) regulated the operation.

The composition of the biogas was measured using gas chromatography (GC) in order to calculate the amount of methane that was produced (Gow Mac Model 350 with thermal conductivity detector; Column: 6'*⅛' stainless steel Poropack Q 80/100 mesh). The total alkalinity, total volatile fatty acids (VFAs), total and soluble COD, sludge volume index (SVI), and total and volatile suspended solids (VSS) were performed according to procedures in Standard Methods (APHA, 1985) [5]. Effluent samples of the AMBR processes were obtained at the midpoint of the time interval between two reversals of flow. At this point, the parameters were assumed to be representative of the overall performance. Moreover, the specific methanogenic activity (SMA) of the biomass was performed according to Rinzema et al. [24].

The microbial load index (MLI) was described by Tay and Yan (1996) and is defined by the ratio of sludge loading rate (SLR) and SMA. The biogas production was corrected to standard temperature and pressure (STP) using the ideal gas law. Next, the standard methane production rate (SMPR) can be obtained after converting the biogas production with the wet volume of the reactor and the methane percentage that is present in the biogas. Therefore, the SMPR is expressed as liters of methane per reactor volume per day (L/L/d). The SMPR is a true measure of the COD that is being removed, because methane is the final product in the stabilization of COD (0.35 L methane/gCOD). The COD loading rate is the amount of COD that is fed into the reactor per reactor volume per day (g/L/d). In order to obtain the theoretical or calculated total COD removal efficiency (calculated TCOD removal) the following formula is used:

Calculated TCOD removal, $$\% = \frac{SMPR}{COD \text{ loading rate } 0.35} \cdot 10$$

TABLE III

Sucrose substrate mixture [37, 32]

| Component | mg added (per g of COD) |
|---|---|
| Sucrose | 960 |
| Bicarbonate, as $NaHCO_3$ | 624 |
| Yeast extract | 3 |
| $NH_4CL$ | 100 |

TABLE III-continued

Sucrose substrate mixture [37, 32]

| Component | mg added (per g of COD) |
| --- | --- |
| $K_2HPO_4$ | 20 |
| $NaH_2PO_4.H_2O$ | 17 |
| $FeCl_2.4H_2O$ | 10 |
| $CoCl_2.6H_2O$ | 2 |
| EDTA | 1 |
| $MnCl_2.4H_2O$ | 0.5 |
| Resazurin | 0.2 |
| $NiCl_2.6H_2O$ | 0.142 |
| $Na_2SeO_3$ | 0.123 |
| $AlCl_3.6H_2O$ | 0.090 |
| $H_3BO_3$ | 0.050 |
| $ZnCl_2$ | 0.050 |
| $(NH_4)_6Mo_7O_{24}.4H_2O$ | 0.050 |
| $CuCl_2.2H_2O$ | 0.038 |
| HCl (37.7% solution) | 0.001 mL |

RESULTS

Figure 15:
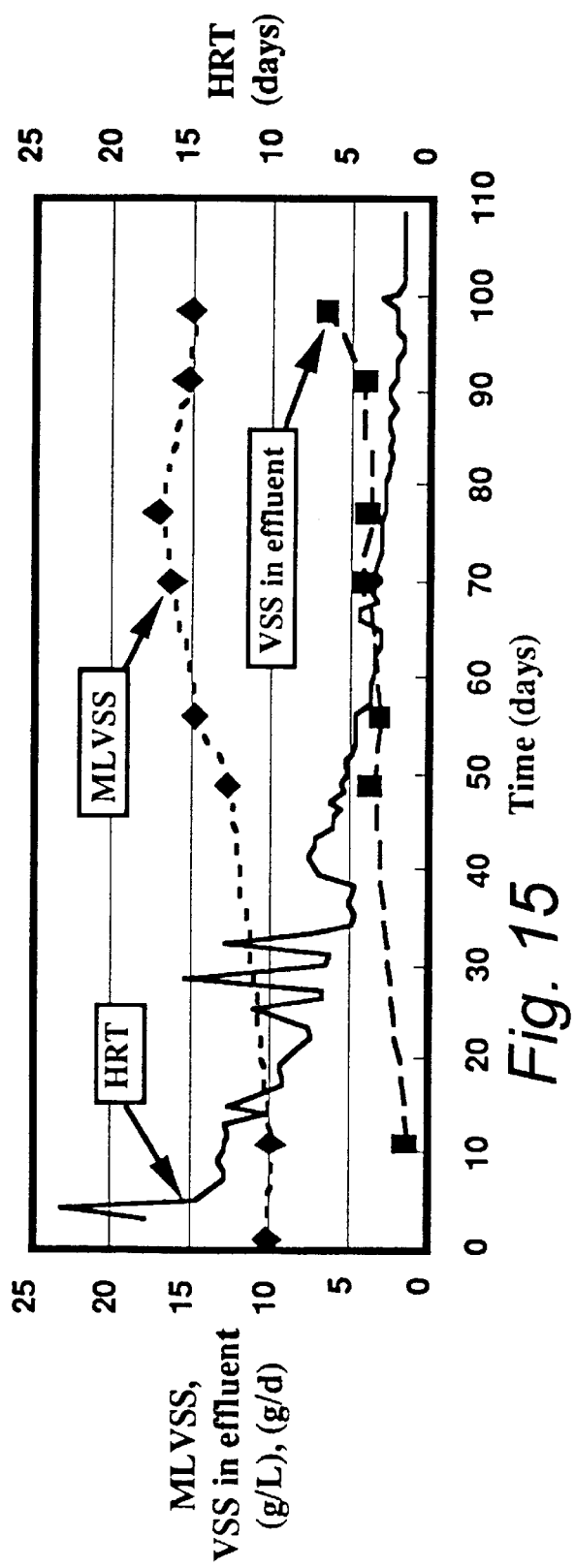
FIG. 15 is a graphical representation showing MLVSS and VSS of the effluent and HRT over time for the 54-liter AMBR of Example 3.
Figure 16:
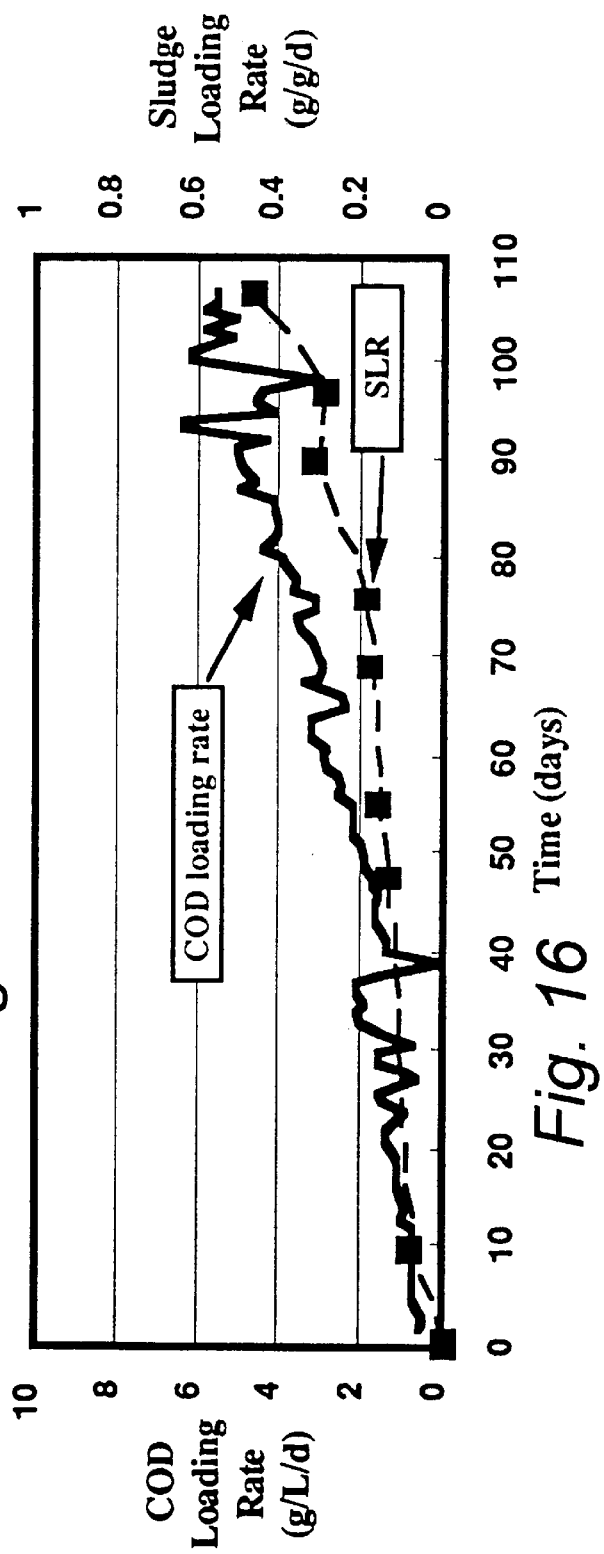
FIG. 16 is a graphical representation showing the COD loading rate and SLR over time for the AMBR of Example 3.
Figure 17:
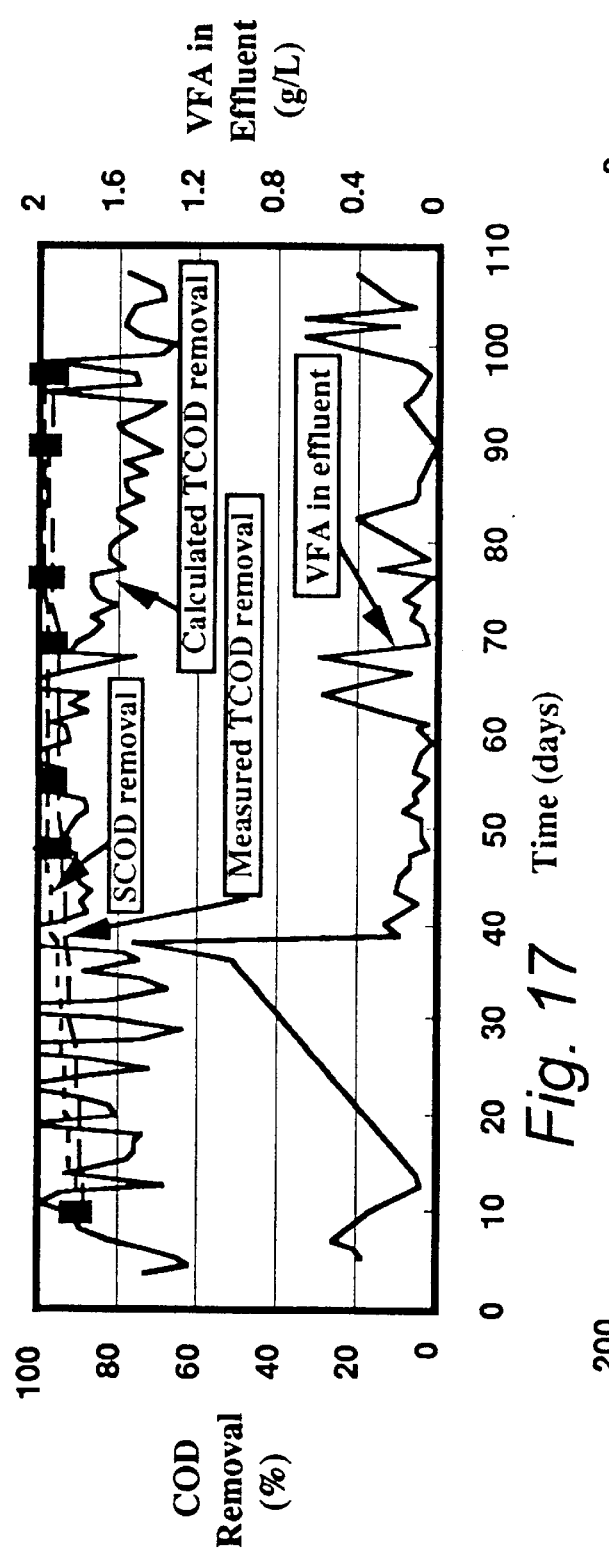
FIG. 17 is a graphical representation showing the COD removal efficiencies and VFA concentration of the effluent for the AMBR of Example 3.

During start-up, the 54-liter AMBR was fed with an influent concentration of 10 gCOD/L at a long HRT. Furthermore, mixing was omitted in the final compartment. This resulted in a low hydraulic selection pressure and thus an efficient solid/liquid separation, which is shown in FIG. 15 by an increase in the mixed liquor volatile suspended solids (MLVSS) of up to 16 g/L. Simultaneously, the COD loading rate was increased to 5.5 g/L/d over a 90 day period with high COD removal efficiencies, as can be seen in FIGS. 16 and 17. A low hydraulic pressure at the start-up resulted in the built up of biomass, which made a quick increase in the COD loading rate possible. However, a flocculent acidogenic sludge with a SVI of 90 mL/gVSS accumulated. At the end of the operational period, the effluent VSS content increased, but the MLVSS stayed constant at 15 g/L.

Figure 18:
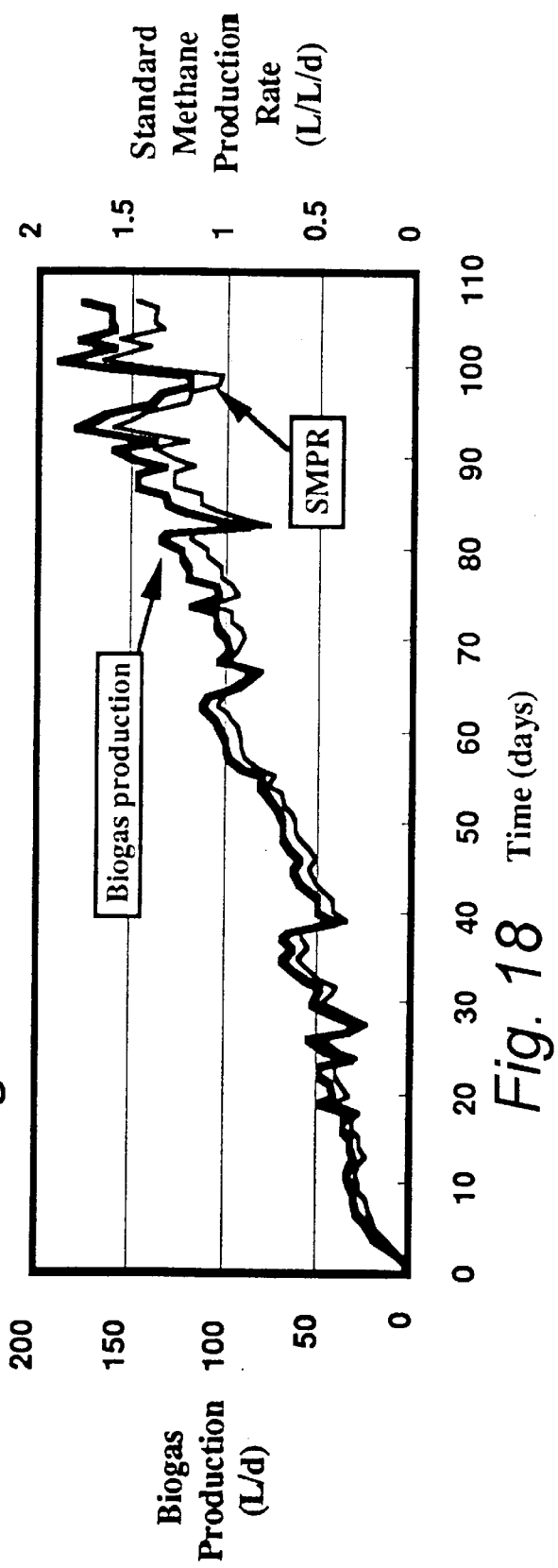
FIG. 18 is a graphical representation showing the biogas production and SMPR over time for the AMBR of Example 3.
Figure 19:
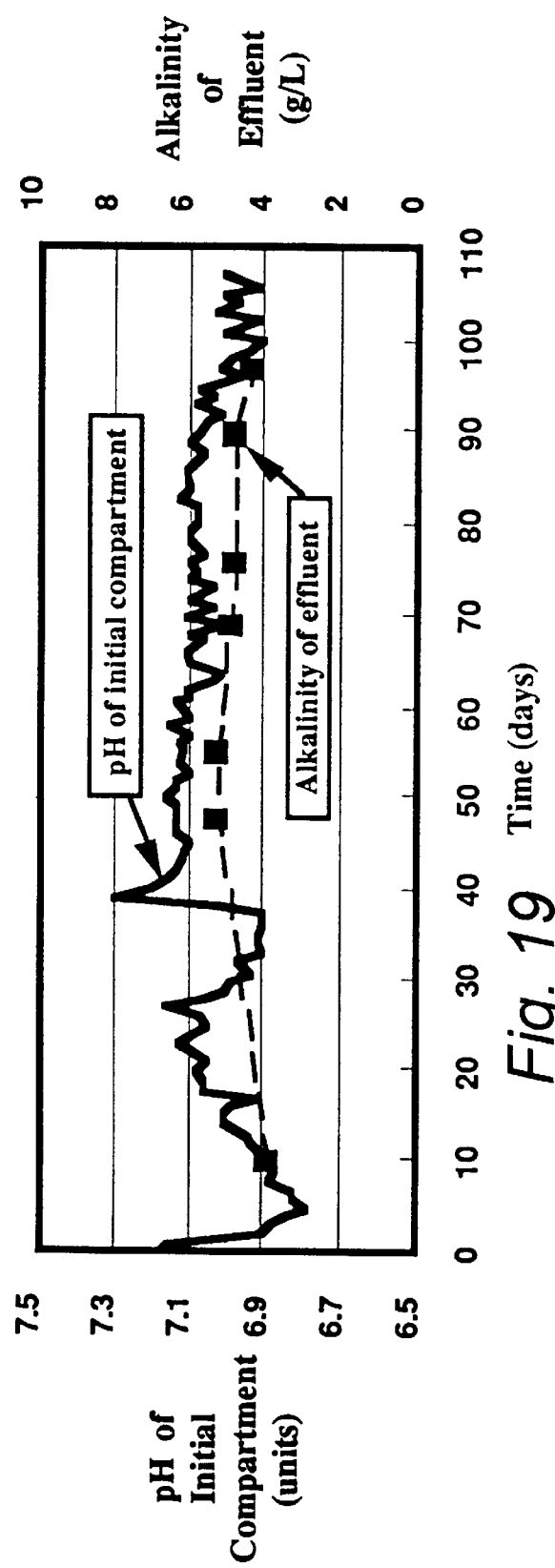
FIG. 19 is a graphical representation showing the pH of the inital compartment and alkalinity of the effluent over time for the AMBR of Example 3.
Figure 20:
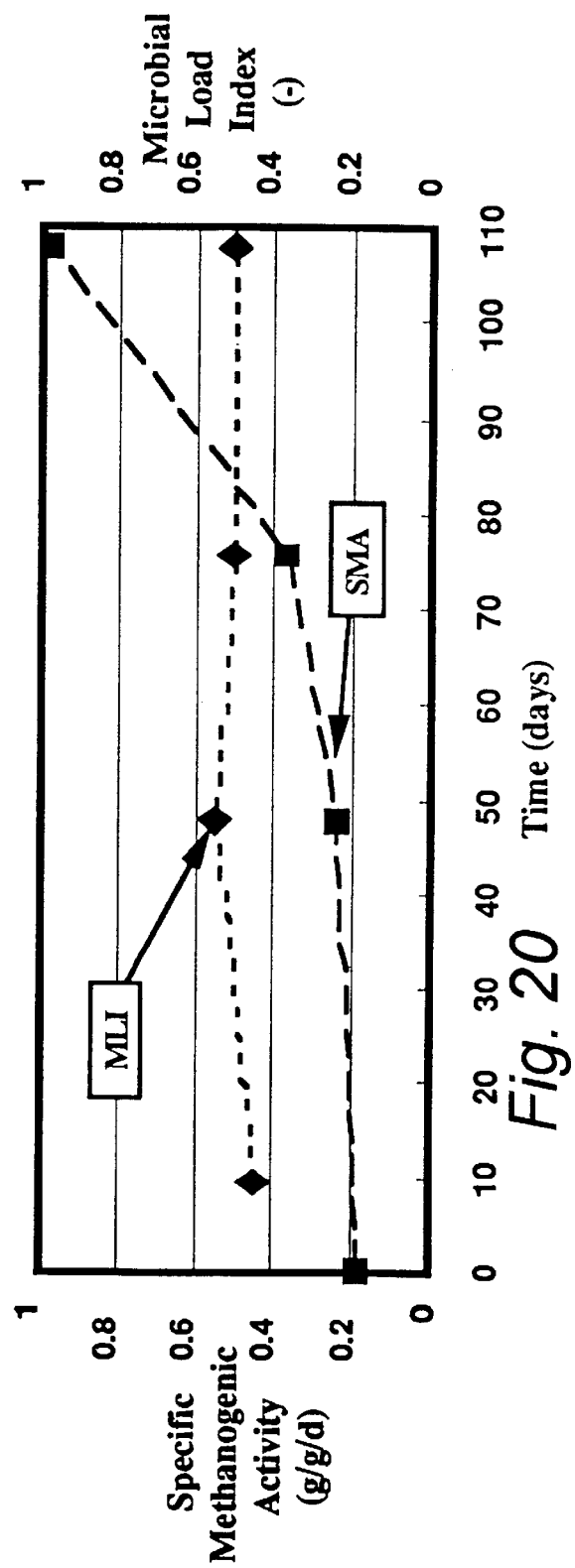
FIG. 20 is a graphical representation showing the variation of SMA and MLI over time for the AMBR of Example 3.

However, further increase of the COD loading rate would have increasingly washed out flocculent biomass and would have decreased the MLVSS significantly. Moreover, a maximum loading rate of 5.5 g/l/d for the AMBR with flocculent biomass was achieved. Therefore, VFA concentrations of the effluent increased at the end of operation, but were still favourable (FIG. 17). Pump failure was responsible for a decreased COD loading rate around day 95. FIG. 16 shows the SLRs over the operational period. Although the SLRs were significantly higher at the end of the operation, the MLI was constant due to the increasing SMA of the biomass (FIG. 20). This phenomenon indicates that stable conditions prevailed in the AMBR even at the higher COD loading rates, since the MLI represents the relative substrate sufficiency subjected to by the biomass. As is shown in FIG. 17, the reactor performance showed favourable conditions over the operational period. Both the SCOD removal and measured total COD (TCOD) removal exceeded 95%. At the end of the operation, a discrepancy between the measured and calculated TCOD removal occurred because of biomass accumulation in the reactor. The measured TCOD removal represents the removal determined by the COD in the effluent, which did not account for the biomass synthesis. However, the calculated TCOD removal included the growth of biomass because influent COD that was utilized by bacteria for the growth did not end up as methane COD. At a COD loading rate of 5.5 g/L/d, the biogas production exceeded 150 L/d which resulted in a SMPR of 1.5 L/L/d and a calculated TCOD removal efficiency of 70%, as can be seen in FIGS. 18 and 17, respectively. The pH of the initial compartment stayed constant at approximately 7.0 over the entire operational period, as can be seen in FIG. 19. Reversing the flow three times per day corresponded to the favourable pH levels in the initial compartment, without having to add enormous amounts of alkalinity to the non-acidified substrate. At these pH levels, methanogenic activities prevailed in all compartments.

DISCUSSION

The laboratory-scale AMBR was able to retain biomass with a SVI of 90 mL/gVSS at a COD loading rate of 5.5 g/L/d and an HRT of two days. Although a granular biomass is beneficial to increasing the organic loading rate and biomass retention, the AMBR can also be operated with less settleable flocculent biomass. The same phenomenon is found for the UASB, in which flocculent sludge showed significantly better performances when treating a slaughterhouse wastewater [25]. In order to further increase the COD loading rates of the AMBR seeded with flocculent biomass, selection of a high settleable biomass is required. Mixing scheme and hydraulic loading rates could be changed to manipulate the selection pressure. In addition, a change in configuration of the AMBR could increase the selection pressure by increasing the biomass migration rate in the reactor. This could be done by placing openings in the bottom of the walls between the compartments instead of the baffles between the compartments. More research will be conducted with changes in the reactor configuration, and in the synthetic substrate to a mixture of sucrose and volatile fatty acids. It is believed that this will significantly shorten the start-up time for an AMBR seeded with flocculent sludge.

CONCLUSION

Based on laboratory studies with a 54-liter AMBR which contained less settleable flocculent biomass (SVI of around 100 ml/gVSS) COD loading rates of 5.5 g/L/d were achieved in a period of three months. At these COD loading rates the AMBR retained its biomass due to an efficient solid/liquid clarification in the final compartment. However, higher COD loading rates could not be achieved, until the system selects for a highly settleable biomass.

The systems described in Examples 1–3 above have certain characteristics. For example, there is no upflow hydraulic pattern in the reactor but granulation is possible. Migration of the biomass from compartment to compartment in the reactor allows the less settleable sludge to wash out of the reactor, thereby selecting for granules. The compartmentalized reactor allows for plug flow conditions giving high removals and allowing the final compartment to act as an internal clarifier because of low biogas production.

It is to be understood that a minimum of two compartments are required if the system is semi-continuously operated. A minimum of three compartments are required if the system is continuouly operated, wherein the middle compartment can be fed before switching the direction of flow in order to prevent a break-through of waste. If more than three compartments are used, two or more compartments can be fed. This step-feeding can be used for example during shock loading.

Mixing is required, but can be accomplished by mechanical mixing by a paddle mixer, impeller mixing, mixing by gas recirculation, or mixing by other means. Feed distribution, and thus an upflow hydraulic pattern could be used where mechanical mixing is not desired. Feeding in the initial compartment could result in mixing there, with no mixing in the remaining compartments.

The system can be designed with openings in the bottom of the inside wall between compartments. This design could be used with high HRT (less flow rate), for example when waste water with solids is used. A quicker migration of the biomass will increase the chance of less settleable solids washing out.

The system may also be designed with baffles between the compartments as shown in FIG. 1. This design can be used where there is a slower speed of migration of biomass required. Otherwise, switching of direction is required too often, for example at low HRTs. At the same conditions, there is less chance of short-circuiting of waste when baffles are placed between the compartments. Baffles positioned before the effluent ports are used to reduce the amount of floating granules that leave the reactor.

The final compartment acts as an internal clarified or a liquid/solid clarification zone. Low gas production occurs in the final compartment due to plug flow conditions.

Switching of the flow direction in the AMBR is done to prevent the accumulation of biomass in the final compartment, since migration of the blanket is required. Also, switching flow direction keeps methanogenic conditions in the initial compartment without having to add enormous amounts of alkalinity or using effluent recycling.

Switching the flow more often over the horizontal plane of the reactor has been beneficial in situations where the pH is dropping in the final compartment. Also, this can be favorable at shock loads—both hydraulic and organic—to prevent accumulation of biomass in the final compartment and/or accumulation of volatile fatty acids in the initial compartment. Therefore, the pH in the intial compartment and the sludge blanket height can be used to determine how often to switch the flow direction of the AMBR.

It is clear that the AMBR has many advantages. The AMBR is structurally simple and no gas-solids separation (GSS) system or feed distribution system is required. In this compartmentalized system intermediates such as $H_2S$ and $H_2$ can be low in the final compartment due to plug flow conditions. Also, recycyling of the effluent is not required in the AMBR. However, recycling of effluent could be applied at certain situations. Further, VFAs can be low in the effluent of a thermophilic reactor since there are low propionic acid levels in the final compartment. Separating the gas phase per compartment by heightening the inside walls can be beneficial in terms of profiles of intermediates over the horizontal plane of the reactor. In the AMBR system no pre-acidification is needed for hydrocarbon waste water, and the AMBR is well suited for low strengh wastes.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

APPENDIX

1. Alphenaar P. A. (1994) Anaerobic granular sludge: Characterization and factors its functioning. Ph.D. dissertation, Wageningen Agricultural University, Wageningen, The Netherlands.
2. Angenent L. T. and Dague R. R. (1995) A laboratory-scale comparison of the UASB and ASBR processes. In: Proc. of the 50th Purdue Industrial Waste Conference (Edited by Dalton C. S. and Wukasch R. F.), pp. 365–377, Ann Arbor Press, Chelsea, Michigan, USA.
3. Angenent L. T. and Dague R. R. (1996) Initial studies on the anaerobic migrating blanket reactor. In: Proc. of the 51st Purdue Industrial Waste Conference (Edited by Dalton C. S. and Wukasch R. F.), Ann Arbor Press, Chelsea, Michigan, USA, pp 271–288.
4. Angenent, L. T., Sung, S. and Dague, R. R. (1997). Granulation and start-up of the anaerobic migrating blanket reactor process. In: 8th International Conference on Anaerobic Digestion (AD-97) Poster Papers, May 25–29, Sendai, Japan.
5. APHA (1985) Standard Methods for the Examination of Water and Wastewater, 16th edition. American Public Health Association, Washington, D. C., USA.
6. Bachman A., Beard V. L. and McCarty P. L. (1982) Comparison of fixed-film reactors with a modified sludge blanket reactor. In: Proc. of the first international Conference on fixed-film Biological processes (Edited by Wu Y. C. and Smith E. D.), pp. 1192–1211, Noyes Publications, Park Ridge, NJ, USA.
7. Bachman A., Beard V. L. and McCarthy P. (1985) Performance characteristics of the anaerobic baffled reactor. Water Res. 19, 99–106.
8. Basu S. K. (1995) Innovative wastewater treatment using reversing anaerobic upflow system (RAUS). In: Proc. of the 50th Purdue Industrial Waste Conference (Edited by Dalton C. S. and Wukasch R. F.), pp. 379–383, Ann Arbor Press, Chelsea, Michigan, USA.
9. Beyen G., Delaplace P., Ghekiere S., Mertens M. and Vriens L. (1988) The anaerobic unitank system for advanced wastewater treatment: pilot- and full-scale experience on brewery wastewater. Mededelingen van de Faculteit Landbouwwetenschappen: Rijksuniversiteit Gent 53, 1927–1938.
10. Dague R. R., McKinney R. E. and Pfeffer J. T. (1970) Solids retention in anaerobic waste treatment systems. J. Water Pollut. Control Fed. 42, Part 2, R29–R45.
11. El-Manouni R., Rouleau D., Mayer R., Guiot S. R. and Samson R. (1992) Comparison of the novel multiplate anaerobic reactor with the upflow anaerobic sludge blanket reactor. In: Proc. of the 46th Industrial Waste Conference (Edited by Dalton C. S. and R. F. Wukasch), pp. 681–687, Lewis Publishers, Chelsea, Michigan, USA.
12. Flamming, J. J., Angenent, L. T., Sung, S. and Dague, R. R. (1997). Treatability studies of a combined industrial wastewater stream using the anaerobic migrating blanket reactor. Proc. of 52nd Purdue Industrial Waste Conference, (accepted for proceedings).
13. Fox P. and Pohland F. G. (1994) Anaerobic treatment applications and fundamentals: substrate specificity during phase separation. Water Environ. Res. 66, 716–724.
14. Grotenhuis J. T. C., Kissel J. C., Plugge C. M., Stams A. J. M. and Zehnder A. J. B. (1991) Role of substrate concentration in particle size distribution of methanogenic granular sludge in UASB reactors. Wat. Res. 25, 21–27.
15. Guiot S. R. and van den Berg L. (1985) Performance of an upflow anaerobic reactor combining sludge blanket and a filter treating sugar waste. Biotechn. Bioeng. 27, 800–806.
16. Guiot S. R., Safi B., Frigon J. C., Mercier P., Mulligan C., Tremblay R. and Samson R. (1995) Performances of a full-scale novel multiplate anaerobic reactor treating cheese whey effluent. Biotechnol. Bioeng. 45, 398–405.
17. Hack P. J. F. M., Vellinga S. H. J. and Habets L. H. A. (1988) Growth of granular sludge in the BIOPAQ IC-reactor. In: Proc. GASMAT Workshop (Edited by Lettinga G., Zehnder A. J. B., Grotenhuis J. T. C. and Hulshoff Pol L. W.), pp. 211–215, Pudoc, Wageningen, The Netherlands.
18. Hulshoff Pol, L. W., Heijnenkamp, K. and Lettinga, G. (1988). The selection pressure as a driving force behind the granulation of anaerobic sludge. Proc. GASMAT Workshop (Edited by Lettinga, G., Zehnder, A. J. B., Grotenhuis, J. T. C. and Hulshoff Pol, L. W.), Pudoc, Wageningen, The Netherlands, pp 153–161.
19. Lettinga G., van Velsen A. F. M., Hobma S. W., de Zeeuw W. J. and Klapwijk A. (1980) Use of the upflow sludge blanket (USB) reactor concept for biological wastewater treatment, especially for anaerobic treatment. Biotechnol. Bioeng. 22, 699–734.
20. Lettinga G. (1995) Anaerobic digestion and wastewater treatment systems. Antonie van Leeuwenhoek 67, 3–28.
21. Levenspiel O. (1972) Chemical Reaction Engineering. 2nd ed., New York, Wiley
22. Märkl H. and Reinhold G. (1994) Der Biogas-Turmreaktors, ein neues reaktorkonzept für die anaeroben abwasserreinigung. Chem.-Ing.-Tech. 66, 534–536. In German.
23. Morvai, L., Miháltz, P. and Czakó, L. (1992). The kinetic basis of a new start-up method to ensure the rapid granulation of anaerobic sludge. Wat. Sci. Tech., 25, 113–122.

APPENDIX-continued

24. Rinzema A., van Lier J. B. and Lettinga G. (1988) Sodium inhibition of acetoclastic methanogens in granular sludge from a UASB reactor. Enzyme and Microb. Technol. 10, 24–32.
25. Sayed, S., de Zeeuw, W., and Lettinga. G (1987). Anaerobic treatment of slaughterhouse waste using a flocculent sludge UASB reactor. Agri. Wastes, 11, 197–226.
26. Sierra-Alverez, R., Hulshoff Pol, L. W. and Lettinga, G. (1988). Start-up of a UASB reactor on a carbohydrate substrate. Proc. GASMAT Workshop (Edited by Lettinga, G., Zehnder, A. J. B., Grotenhuis, J. T. C. and Hulshoff Pol, L. W.), Pudoc, Wageningen, The Netherlands, pp 223–228.
27. Sung S. and Dague R. R. (1992) Fundamental principles of the Anaerobic Sequencing Batch Reactor Process. In: Proc. of the 47th Purdue Industrial Waste Conference (Edited by Dalton C. S. and Wukasch R. F.), pp. 393–407, Lewis Publishers, Chelsea, Michigan, USA.
28. Sung S. and Dague R. R. (1995) Laboratory studies on the anaerobic sequencing batch reactor. Water Environ. Res. 67, 294–310.
29. Tay, J. and Yan, Y. (1996). Influence of substrate concentration on microbial selection and granulation during start-up of upflow anaerobic sludge blanket reactors. Water Environ. Res., 68, 1140–1150.
30. Vanderhaegen B., Ysebaert E., Favere K., van Wambeke M., Peeters T., Pánic V., Vandenlangenbergh V. and Verstraete W. (1992) Acidogenesis in relation to in-reactor granule yield. Wat. Sci. Tech. 25, 21–30.
31. Van Lier J. B., Boersma F., Debets M. M. W. H. and Lettinga G. (1994) 'High rate' thermophilic anaerobic wastewater treatment in compartmentalized upflow reactors. In: Proc. seventh international symposium on anaerobic digestion, Cape Town, South Africa, pp. 338–347. Wat. Sci. Technol. 30, 251–261.
32. Van Lier, J. B. (1995). Thermophilic anaerobic wastewater treatment; temperature aspects and process stability, Ph.D. Thesis, Wageningen Agricultural University, Wageningen, The Netherlands.
33. Van Lier J. B. (1996) Limitations of thermophilic anaerobic wastewater treatment and the consequences for process design. Antonie van Leeuwenhoek, 69, 1–14.
34. Verstraete W. (1991) Anaerobic treatment of effluents: state of the art in Europe. Mededelingen van de Faculteit Landbouwwetenschappen: Rijksuniversiteit Gent, 56, 97–111.
35. Wirtz R. A., Dague R. R. (1994) Enhancement of granulation and start-up in the anaerobic sequencing batch reactor. In: Proc. 67th Annual Conference of the WEF, Chicago, Illinois, USA, pp. 241–252.
36. Yang P. Y. and Chou C. Y. (1984) Horizontal-baffled anaerobic reactor for treating diluted swine wastewater. In: Proc. of the 39th Purdue Industrial Waste Conference (Edited by Bell J. M.), pp. 585–597, Ann Arbor Science Book, Butterworth publishers, Boston, USA.

APPENDIX-continued

37. Zehnder, A. J B., Huser, B. A., Brock, T. D. and Wuhrman, K. (1980). Characterization of an acetate-decarboxylating, non-hydrogen-oxidizing methane bacteria. Arch. Microbiol., 124, 1–11.
38. Zilverentand A. (1996) Personal communication.

What is claimed is:

1. A method of treating a waste stream, comprising the steps of: feeding a waste stream in a first direction into a reactor having multiple compartments connected in fluid communication with a next adjacent compartment;

maintaining anaerobic reaction conditions of the waste stream in the compartments;

discharging a treated waste stream from the reactor; and discontinuing the feeding of the waste stream in the first direction and initiating feeding of the waste stream in a second opposite direction in response to a predetermined condition.

2. The method of claim 1 wherein the predetermined condition is a predetermined pH in the compartment being fed with the waste system.

3. The method of claim 2 wherein the predetermined pH is about 6.0.

4. The method of claim 1 wherein the predetermined condition is a predetermined sludge blanket height in the compartment from which the treated waste stream is being discharged.

5. The method of claim 1 wherein the predetermined condition is a predetermined time interval.

6. The method of claim 1 wherein the reactor includes two compartments.

7. The method of claim 6 wherein the feeding of the waste stream is semi-continuous.

8. The method of claim 1 wherein the reactor includes three or more compartments.

9. The method of claim 8 wherein the feeding of the waste stream is continuous.

10. The method of claim 9 wherein the reactor operates under plug flow conditions.

* * * * *

UNITED STATES PATENT AND TRADEMARK OFFICE
CERTIFICATE OF CORRECTION

PATENT NO. : 5,885,460
DATED : March 23, 1999
INVENTOR(S) : Richard R. Dague, et al.

It is certified that error appears in the above-indentified patent and that said Letters Patent is hereby corrected as shown below:

Column 1, line 60, delete "(US SB)" and insert --(USSB)--.

Column 5, line 35, delete "$\% = \frac{SMPR}{COD \text{ loading rate } 0.35} \cdot 10$" and insert --$\% = \frac{SMPR}{COD \text{ loading rate } 0.35} \cdot 100$--.

Column 18, line 55, delete "$\% = \frac{SMPR}{COD \text{ loading rate } 0.35} \cdot 10$" and insert --$\% = \frac{SMPR}{COD \text{ loading rate } 0.35} \cdot 100$--.

Signed and Sealed this

Fourteenth Day of September, 1999

Q. TODD DICKINSON

*Attest:*

*Attesting Officer*        *Acting Commissioner of Patents and Trademarks*